United States Patent
Yu et al.

(10) Patent No.: US 11,297,517 B2
(45) Date of Patent: Apr. 5, 2022

(54) MEASUREMENT METHOD, TERMINAL DEVICE, AND ACCESS NETWORK DEVICE

(71) Applicant: HUAWEI TECHNOLOGIES CO., LTD., Guangdong (CN)

(72) Inventors: Haifeng Yu, Beijing (CN); Xin Xiong, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 123 days.

(21) Appl. No.: 16/749,307

(22) Filed: Jan. 22, 2020

(65) Prior Publication Data

US 2020/0162952 A1 May 21, 2020

Related U.S. Application Data

(63) Continuation of application No. PCT/CN2018/096192, filed on Jul. 19, 2018.

(30) Foreign Application Priority Data

Jul. 25, 2017 (CN) .......................... 201710610923.2

(51) Int. Cl.
*H04W 24/08* (2009.01)
*H04W 24/10* (2009.01)
*H04W 72/04* (2009.01)

(52) U.S. Cl.
CPC ........... *H04W 24/08* (2013.01); *H04W 24/10* (2013.01); *H04W 72/04* (2013.01)

(58) Field of Classification Search
CPC ..... H04W 24/10; H04W 72/04; H04W 72/08; H04W 24/08; H04W 36/06; H04W 36/00
See application file for complete search history.

(56) References Cited

U.S. PATENT DOCUMENTS 10,129,782 B2 * 11/2018 Novlan ................. H04W 24/10
2011/0105126 A1 5/2011 Liang et al.
(Continued)

FOREIGN PATENT DOCUMENTS

CN 101064898 A 10/2007
CN 101094482 A 12/2007
(Continued)

OTHER PUBLICATIONS

3GPP TSG RAN WG1 Meeting #88bis,R1-1704334,: RRM Measurements for NR ATandT Spokane, USA Apr. 3-7, 2017 total 2 pages.
(Continued)

*Primary Examiner* — Brian D Nguyen
(74) *Attorney, Agent, or Firm* — Womble Bond Dickinson (US) LLP

(57) ABSTRACT

This disclosure provides a measurement method, a terminal device, and an access network device. The method includes: receiving, by a terminal device, a first message sent by an access network device, where the first message includes measurement type information, the measurement type information is used to indicate a first measurement granularity, and the first measurement granularity is one of a cell measurement granularity or a beam measurement granularity; and obtaining, by the terminal device, a measured value of a measurement object corresponding to the first measurement granularity. In the embodiments of this disclosure, by introducing different measurement type information, measurement of different granularities may be implemented, so that the measurement granularity is more refined and measurement results are more accurate.

20 Claims, 10 Drawing Sheets

(56) References Cited

U.S. PATENT DOCUMENTS

| | | | |
|---|---|---|---|
| 2011/0217985 A1* | 9/2011 | Gorokhov | H04W 24/10 |
| | | | 455/452.2 |
| 2012/0057539 A1 | 3/2012 | Kuo | |
| 2013/0242787 A1 | 9/2013 | Sun et al. | |
| 2014/0073329 A1 | 3/2014 | Kang et al. | |
| 2014/0146691 A1 | 5/2014 | Soliman | |
| 2014/0253389 A1* | 9/2014 | Beauregard | G01S 11/16 |
| | | | 342/458 |
| 2016/0192329 A1 | 6/2016 | Park et al. | |
| 2017/0012692 A1 | 1/2017 | Kim et al. | |
| 2017/0055187 A1 | 2/2017 | Kang et al. | |
| 2017/0150427 A1 | 5/2017 | Cheng et al. | |
| 2019/0007897 A1 | 1/2019 | Ng et al. | |
| 2019/0074877 A1 | 3/2019 | Nigam et al. | |
| 2019/0230574 A1* | 7/2019 | Novlan | H04J 11/0023 |
| 2020/0119800 A1* | 4/2020 | Rune | H04W 76/28 |
| 2020/0145981 A1* | 5/2020 | Harada | H04L 5/0025 |
| 2020/0245348 A1* | 7/2020 | Chen | H04B 7/0626 |
| 2020/0296761 A1* | 9/2020 | Liu | H04L 5/1415 |

FOREIGN PATENT DOCUMENTS

| | | |
|---|---|---|
| CN | 102067479 A | 5/2011 |
| CN | 103813376 A | 5/2014 |
| CN | 104813700 A | 7/2015 |
| CN | 104955061 A | 9/2015 |
| CN | 105556869 A | 5/2016 |
| CN | 105580292 A | 5/2016 |
| CN | 105580297 A | 5/2016 |
| CN | 106031051 A | 10/2016 |
| CN | 106341873 A | 1/2017 |
| CN | 106470422 A | 3/2017 |
| CN | 106576265 A | 4/2017 |
| CN | 106685504 A | 5/2017 |
| CN | 106973400 A | 7/2017 |
| CN | 108282868 A | 7/2018 |
| EP | 2426987 A3 | 8/2012 |
| WO | 2017022870 A1 | 2/2017 |
| WO | 2017123078 A1 | 7/2017 |

OTHER PUBLICATIONS

Huawei et al: "Measurement configuration and procedures for SS and CSI-RS",3GPP Draft; R2-1706730,Jun. 17, 2017 (Jun. 17, 2017),XP051307099,total 6 pages.

3GPP TS 36.331 V14.3.0 (Jun. 2017);3rd Generation Partnership Project;Technical Specification Group Radio Access Network;Evolved Universal Terrestrial Radio Access (E-UTRA);Radio Resource Control (RRC);Protocol specification (Release 14);total 745 pages.

3GPP TS 36.133 V14.4.0 (Jun. 2017);3rd Generation Partnership Project;Technical Specification Group Radio Access Network;Evolved Universal Terrestrial Radio Access (E-UTRA);Requirements for support of radio resource management(Release 14);total 2582 pages.

3GPP TSG-RAN WG2 NR,R2-1700247,:"IDLE mode operation in NR",MediaTek Inc., ASUSTek,Spokane, USA, Jan. 17-19, 2017,total 5 pages.

Huawei et al:"Measurement Configuration and reporting for mobility considering Beamforming",3GPP Draft; R2-1705527,May 6, 2017 (May 6, 2017), XP051264878,total 4 pages.

3GPP TS 36.321 V14.3.0 (Jun. 2017);3rd Generation Partnership Project;Technical Specification Group Radio Access Network;Evolved Universal Terrestrial Radio Access (E-UTRA);Medium Access Control (MAC) protocol specification (Release 14);total 107 pages.

NTT Docomo et al: "Discussion on mobility procedure for NR", 3GPP Draft; R1-1702833,Feb. 12, 2017 (Feb. 12, 2017),XP051209978,total 6 pages.

Ericsson,"RRC Measurement report Triggering",3GPP TSG-RAN WG2 #97 Tdoc R2-1700859,Athens, Greece, Feb. 13, 17, 2017,total 5 pages.

Ericsson: "Remaining open issues on measurement reporting in NR",3GPP Draft; R2-1707286,Jun. 16, 2017 (Jun. 16, 2017), XP051306916,total 8 pages.

Nokia et al.,"UE and Network Based Beam Management in NR",3GPP TSG-RAN WG2 Meeting #97 R2-1701684 (R2-1700074),Athens, Greece, Feb. 13-17, 2017,total 3 pages.

3GPP TS 38.331 V0.0.4 (Jun. 2017), 3rd Generation Partnership Project; Technical Specification Group Radio Access Network; NR; Radio Resource Control (RRC); Protocol specification(Release 15 ), 22 pages.

3GPP TSG RAN WG1 Meeting #89,R1-1707694 NR 4-Step Random Access Procedure,Guangdong OPPO Mobile Telecom,Hangzhou, P.R. China May 15, 19, 2017,total 5 pages.

3GPP TSG RAN WG1 Meeting #88,R1-1702831,Discussion on 4-step random access procedure for NR,NTT Docomo, Inc.,Athens, Greece, Feb. 13-17, 2017.

Vivo. Counter Design for Random Access Procedure. 3GPP TSG-RAN WG2 NR Ad Hoc, Qingdao, China, 27th Jun. 29, 2017, R2-1706966, 4 pages.

* cited by examiner

100

A terminal device receives a first message sent by an access network device, where the first message includes measurement type information, the measurement type information is used to indicate a first measurement granularity, and the first measurement granularity is one of a cell measurement granularity or a beam measurement granularity ~ 110

The terminal device obtains a measured value of a measurement object corresponding to the first measurement granularity ~ 120

FIG. 1

MEASUREMENT METHOD, TERMINAL DEVICE, AND ACCESS NETWORK DEVICE

CROSS-REFERENCE TO RELATED APPLICATIONS

This disclosure is a continuation of International Application No. PCT/CN2018/096192, filed on Jul. 19, 2018, which claims priority to Chinese Patent Application No. 201710610923.2, filed on Jul. 25, 2017. The disclosures of the aforementioned disclosures are hereby incorporated by reference in their entireties.

TECHNICAL FIELD

This disclosure relates to the communications field, and more specifically, to a measurement method, a terminal device, and an access network device.

BACKGROUND

In the existing long term evolution (LTE) technology, during cell measurement, a start threshold and a stop threshold of measuring, by a control terminal device, an adjacent cell are stipulated. When a measured value of a signal of a serving cell is less than the threshold, that is, when signal quality of the serving cell is relatively poor, the terminal device starts measurement of the adjacent cell. However, when a measured value of a signal of a serving cell is greater than the threshold, that is, when signal quality of the serving cell is good enough, the terminal device usually stops measuring the adjacent cell, to achieve power saving.

With the gradual development of technologies, the 4th generation (4G) mobile communication technology has entered a scale commercial phase. The future-oriented 5th generation (5G) mobile communication technology has also become a global hot spot for research and development. The mobile Internet and the Internet of Things are main driving forces in future communication development, leading to diversified 5G services. To improve a transmission rate of signals in the 5G services, a method for high frequency transmission is used in the 5G field. When the high frequency transmission is used, a concept of a beam is introduced. Correspondingly, in the 5G field, during cell measurement similar to that in the LTE technology, a measurement granularity needs to be more refined. Therefore, the measurement method based on a cell granularity in the existing LTE technology is no longer applicable to the 5G field. Therefore, a measurement method applicable to the 5G field needs to be found, to implement beam measurement in the 5G field, so that selection of a beam having good communication quality as a serving beam for the terminal device is implemented, thereby ensuring smooth communication.

SUMMARY

This disclosure provides a measurement method, a terminal device, and an access network device. By introducing different measurement types, measurement of different granularities may be implemented, so that the measurement granularity is more refined and measurement results are more accurate.

According to a first aspect, a measurement method is provided. The method includes: receiving, by a terminal device, a first message sent by an access network device, where the first message includes measurement type information, the measurement type information is used to indicate a first measurement granularity, and the first measurement granularity is one of a cell measurement granularity or a beam measurement granularity; and obtaining, by the terminal device, a measured value of a measurement object corresponding to the first measurement granularity.

In this embodiment of this disclosure, by introducing different measurement types, measurement of different granularities may be implemented, so that the measurement granularity is more refined and measurement results are more accurate.

In some embodiments, the first message further includes a measurement threshold corresponding to the first measurement granularity.

In some embodiments, the first measurement granularity is a beam measurement granularity, the first message further includes a beam identifier of one or more beams, the measurement object includes a current serving beam and some or all of the one or more beams, and the measured value includes a first measured value and a second measured value; and the obtaining, by the terminal device, a measured value of a measurement object corresponding to the first measurement granularity includes: measuring, by the terminal device, a reference signal of the current serving beam, to obtain the first measured value of the current serving beam; and measuring a reference signal of some or all of the one or more beams if the first measured value is less than or equal to the measurement threshold, to obtain the second measured value.

In this embodiment of this disclosure, only when signal quality of the current serving beam on which the terminal device is located is poor, the terminal device needs to measure another beam, to reduce signaling overheads, and reduce energy consumption of the terminal device.

In some embodiments, the first measurement granularity is a beam measurement granularity, the measurement object includes a current serving beam, and the measured value includes a first measured value; and the obtaining a measured value includes: measuring, by the terminal device, a reference signal of the current serving beam, to obtain the first measured value of the current serving beam.

In some embodiments, the measured value further includes a second measured value; and after obtaining the first measured value, the method further includes: sending, by the terminal device, a configuration request message to the access network device if the first measured value is less than or equal to the measurement threshold, where the configuration request message is used to request the access network device to send information about another beam other than the current serving beam; receiving, by the terminal device, a second message sent by the access network device, where the second message includes an identifier of one or more beams, and the one or more beams are other beams other than the current serving beam; and measuring, by the terminal device, a reference signal of some or all of the one or more beams, to obtain the second measured value.

In this embodiment of this disclosure, only when needing to measure another beam, the terminal device sends the configuration request message to the access network device, to request the access network device to send configuration information of the another beam, thereby reducing unnecessary signaling wastes, and reducing energy consumption.

In some embodiments, the second message is a physical downlink control channel PDCCH message, a media access control control element (MAC CE) message, or a radio resource control RRC message.

In some embodiments, the first message further includes measurement report configuration information, the measurement report configuration information instructs the terminal device to send a measured value of each of N beams in a measurement report, or the measurement report configuration information instructs the terminal device to send a combined value of measured values of the N beams in a measurement report, where N is a positive integer greater than or equal to 1.

In some embodiments, after the obtaining, by the terminal device, a measured value of a measurement object corresponding to the first measurement granularity, the method further includes: sending, by the terminal device, the measurement report to the access network device, where the measurement report includes N measured values, or the measurement report includes the combined value, and the combined value is the combined value of the N measured values. The N measured values have a one-to-one correspondence with the N beams, and the N measured values are greater than or equal to a first threshold.

In some embodiments, the reference signal includes one or more of the following: a channel state information-reference signal (CSI-RS), a demodulation reference signal (DMRS), or a synchronization signal block (SS block).

In some embodiments, the first message is a media access control control element (MAC CE) message or a radio resource control RRC message.

According to a second aspect, a measurement method is provided. The method includes: determining, by an access network device, a first measurement granularity as a cell measurement granularity or a beam measurement granularity; and sending, by the access network device, a first message to a terminal device, where the first message includes measurement type information, and the measurement type information is used to indicate the first measurement granularity.

In this embodiment of this disclosure, measurement type information indicating different measuring granularities is sent to the terminal device, so that the measurement granularity is more refined and measurement results are more accurate.

In some embodiments, the first message further includes: a measurement threshold corresponding to the first measurement granularity.

In some embodiments, the first measurement granularity is a beam measurement granularity, and the first message further includes an identifier of one or more beams.

In some embodiments, after the sending, by the access network device, a first message to a terminal device, the method further includes: receiving, by the access network device, a configuration request message sent by the terminal device, where the configuration request message is used to request the access network device to send information about another beam other than the current serving beam; and sending, by the access network device, a second message to the terminal device, where the second message includes an identifier of one or more beams, and the one or more beams are other beams other than the current serving beam.

In this embodiment of this disclosure, only when signal quality of the current serving beam on which the terminal device is located is poor, the terminal device needs to measure another beam, and only when needing to measure the another beam, the terminal device sends the configuration request message to the access network device, to request configuration information of the another beam, thereby reducing signaling overheads, and reducing energy consumption of the terminal device.

In some embodiments, the second message is a physical downlink control channel (PDCCH) message, a media access control control element (MAC CE) message, or a radio resource control (RRC) message.

In some embodiments, the first message further includes measurement report configuration information, the measurement report configuration information instructs the terminal device to send a measured value of each of N beams in a measurement report, or the measurement report configuration information instructs the terminal device to send a combined value of measured values of the N beams in a measurement report, where N is a positive integer greater than or equal to 1.

In some embodiments, the access network device receives the measurement report sent by the terminal device, where the measurement report includes N measured values, or the measurement report includes the combined value, and the combined value is the combined value of the N measured values. The N measured values have a one-to-one correspondence with the N beams, and the N measured values are greater than or equal to a first threshold.

In some embodiments, the first message is a media access control control element (MAC CE) message or a radio resource control (RRC) message.

According to a third aspect, a terminal device is provided. The terminal device includes one or more modules configured to perform the method embodiments according to the first aspect.

According to a fourth aspect, an access network device is provided. The access network device includes one or more modules configured to perform the method embodiments according to the second aspect.

According to a fifth aspect, a terminal device is provided. The terminal device includes a memory and a processor. The memory is configured to store program code, and the processor is configured to invoke the program code, to implement the method according to the first aspect and the embodiments of the first aspect.

According to a sixth aspect, an access network device is provided. The access network device includes a memory and a processor. The memory is configured to store program code, and the processor is configured to invoke the program code, to implement the method according to the second aspect and the embodiments of the second aspect.

According to a seventh aspect, a computer-readable medium is provided. The computer-readable medium is configured to store program code executed by a terminal device, and the program code includes an instruction used to perform the method according to the first aspect and the embodiments of the first aspect.

According to an eighth aspect, a computer-readable medium is provided. The computer-readable medium is configured to store program code executed by an access network device, and the program code includes an instruction used to perform the method according to the second aspect and the embodiments of the second aspect.

According to a ninth aspect, a system chip is provided. The system chip includes an input/output interface, at least one processor, at least one memory, and a bus. The at least one memory is configured to store code, and the at least one processor is configured to invoke the code in the at least one memory, to perform operations of the methods according to the foregoing aspects.

BRIEF DESCRIPTION OF DRAWINGS

FIG. 1 is a schematic flowchart of a measurement method according to an embodiment of this disclosure;

DESCRIPTION OF EMBODIMENTS

Figure 2:
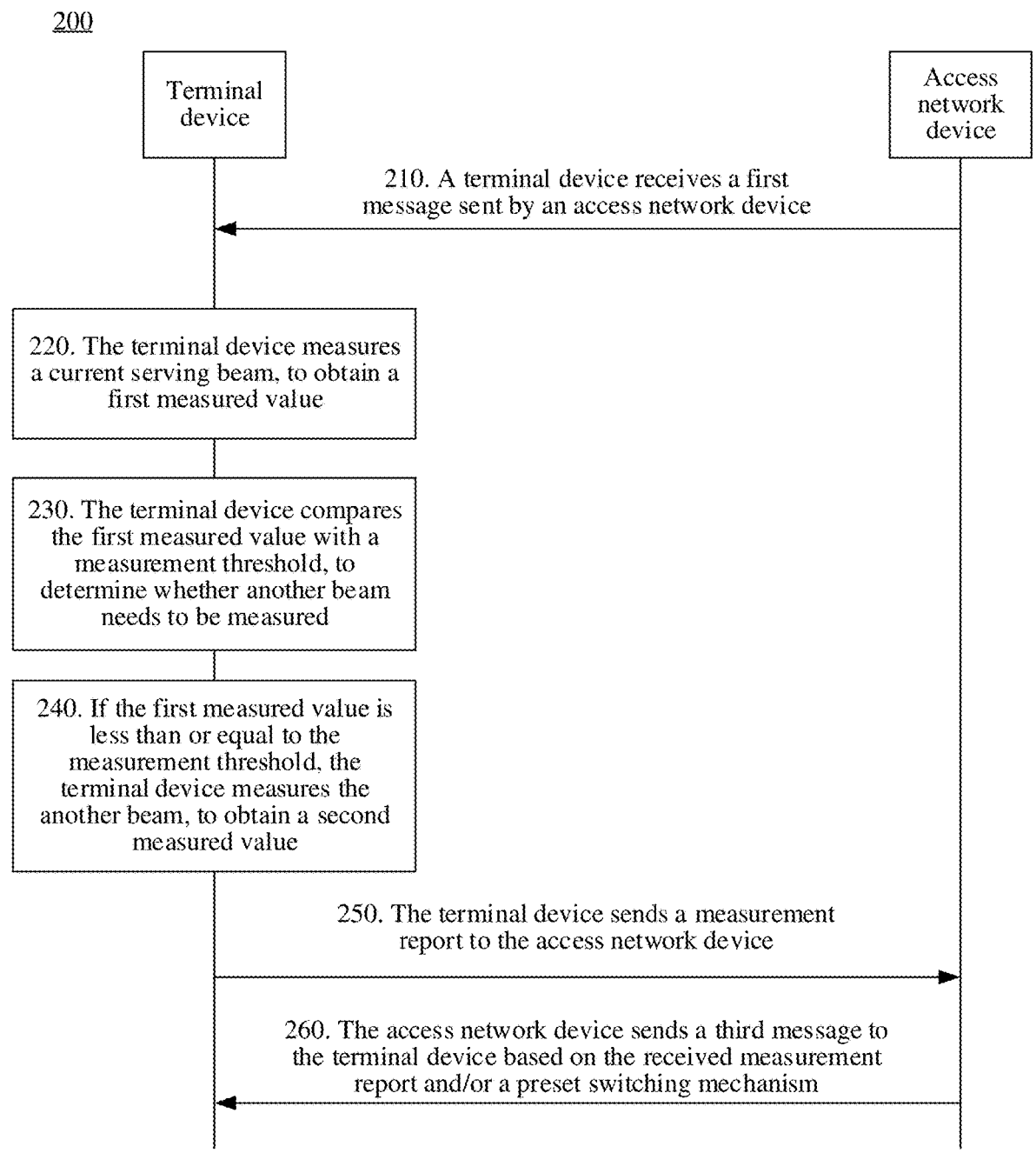
FIG. 2 is another schematic flowchart of a measurement method according to an embodiment of this disclosure.

The following describes technical solutions in embodiments of this disclosure with reference to accompanying drawings.

FIG. 1 is a schematic flowchart of a measurement method 100 according to an embodiment of this disclosure. As shown in FIG. 1, the method 100 includes the following operations.

110. A terminal device receives a first message sent by an access network device.

The first message includes measurement type information, the measurement type information is used to indicate a first measurement granularity, and the first measurement granularity may be one of a cell measurement granularity or a beam measurement granularity.

It should be understood that, when the measurement granularity is a beam measurement granularity, the beam may be one beam, or a beam group formed by a plurality of beams or a transmission reception point (transmission reception point, TRP). Therefore, when the first measurement granularity is a beam measurement granularity, the measurement granularity in this case may actually be any one of a beam measurement granularity, a beam group measurement granularity and a TRP measurement granularity.

It should be understood that, in this embodiment of this disclosure, the first measurement granularity indicated by the measurement type information may alternatively be another measurement granularity. In this embodiment of this disclosure, only a cell measurement granularity and a beam measurement granularity are used as examples to describe a measurement granularity indicated by measurement type information, but this embodiment of this disclosure is not limited thereto.

In some embodiments, the first message may be a physical downlink control channel (PDCCH) information, or a medium access control control element (MAC CE) information.

In some embodiments, the first message may be carried by a connection reconfiguration message of radio resource control (RRC), and sent by the access network device to the terminal device, or may be carried by another RRC signaling and sent by the access network device to the terminal device. This is not limited in this embodiment of this disclosure.

In this embodiment of this disclosure, the measurement method is a method for measuring a reference signal of a cell or a beam. Specifically, when the measurement granularity is a cell measurement granularity, the measurement method may be a method for measuring reference signal received power (RSRP) and/or a method for measuring reference signal received quality (RSRQ) of one or more cells. When the measurement granularity is a beam measurement granularity, the measurement method may be a method for measuring RSRP of one or more beams and/or a method for measuring RSRQ of one or more beams.

120. The terminal device obtains a measured value of a measurement object corresponding to the first measurement granularity.

In this embodiment of this disclosure, measurement type information used to indicate different measurement granularities is introduced, to enable the terminal device to measure different measurement objects corresponding to the measurement type information, so that measurement of beam granularities may be implemented, the measurement granularity is more refined and measurement results are more accurate.

It should be understood that, in this embodiment of this disclosure, measurement of a cell granularity in the existing LTE technology may be implemented, and measurement of a beam granularity may also be implemented. The specific measurement method may be determined based on the first measurement granularity indicated by the measurement type information configured by the access network device to the terminal device.

It should be further understood that, when the measurement granularity indicated by the measurement type information is a cell measurement granularity, the measurement method is basically the same as the cell measurement method in the existing LTE technology. This is not particularly described in this embodiment of this disclosure. In this embodiment of this disclosure, description of a measurement method in which the first measurement granularity indicated by the measurement type information is a beam measurement granularity is mainly focused on.

In some embodiments, the first message may further include a measurement threshold corresponding to the first measurement granularity. The measurement threshold has a same function as the measurement threshold in the prior art, and is used to be compared with a measured value of a current serving cell in which the terminal device is located or a measured value of a current serving beam, to determine whether another cell or another beam needs to be measured.

However, in this embodiment of this disclosure, for different measurement granularities, the measurement threshold may be different. For example, when the first measurement granularity is a cell measurement granularity, the measurement threshold corresponds to a cell measurement threshold, and when the first measurement granularity is a beam measurement granularity, the measurement threshold corresponds to a beam measurement threshold. The cell measurement threshold and the beam measurement threshold may be different, and certainly a case in which the two values are the same may exist. This is not limited in this embodiment of this disclosure.

In some embodiments, the measurement threshold is a measurement threshold of the current serving cell or the current serving beam, and a measurement threshold may not be set for another cell or another beam.

In some embodiments, when the first measurement granularity is a beam measurement granularity, the first message further includes a beam identifier of one or more beams, the beam identifier is used to indicate different beams, and the one or more beams are other beams other than the current serving beam in the beams.

It should be understood that, the beam identifier is further used to inform the terminal device of information related to a beam that the terminal device needs to measure, for example, a carrier frequency or frequency, a measured bandwidth, and a frequency offset value of the beam that the terminal device needs to measure and/or some other indication information that may be used to indicate the beam. Through the beam identifier, the terminal device is enabled to know information such as how to measure the beam and the measured frequency.

In some embodiments, the first message may alternatively include a beam identifier of the current serving beam.

Specifically, when the terminal device needs to measure a beam, the terminal device first needs to know which beam is to be measured by the terminal device. For the current serving beam, the terminal device may determine the current serving beam based on the beam identifier of the current serving beam. The beam identifier of the current serving beam may be sent by the access network device to the terminal device through the first message, or may be determined by the terminal device. For another one or more beams other than the current serving beam, the terminal device first needs to receive a beam identifier of the another one or more beams configured by the access network device, and measures the corresponding beam based on the beam identifier.

In some embodiments, when the first measurement granularity is a cell measurement granularity, the first message may include a cell identifier of the current serving cell and a cell identifier of another cell other than the current serving cell. The cell identifier is used to indicate different cells, so that the terminal device learns how to measure the cell, and leans of the measured carrier frequency or frequency, the measured bandwidth, the frequency offset value and the like.

In some embodiments, the first message may further include a measurement object, and when the first measurement granularity is a beam measurement granularity, the measurement object may include the current serving beam, or may include another one or more beams other than the current serving beam.

In other words, the measurement object included in the first message may be a reference signal of the current serving beam, or may be a reference signal of the another one or more beams other than the current serving beam.

In some embodiments, the reference signal may be referred to as a beam reference signal (BRS), and the BRS may be a channel state information-reference signal (CSI-RS), may be a demodulation reference signal (DM-RS), or may be a synchronization signal block (SS block), or another reference signal. This embodiment of this disclosure is not limited thereto.

In some embodiments, the terminal device measures a reference signal of the current serving beam, to obtain a first measured value; and measures a reference signal of some or all of another one or more beams other than the current serving beam, to obtain a second measured value.

It should be understood that, because the terminal device measures a reference signal of some or all of another one or more beams other than the current serving beam, to obtain a second measured value, the second measured value may be one or more values.

Correspondingly, operation 120, that is, the terminal device obtains a measured value of a measurement object corresponding to the first measurement granularity, may include: first measuring, by the terminal device, the reference signal of the current serving beam, to obtain the first measured value of the current serving beam; and measuring, by the terminal device, the reference signal of some or all of another one or more beams other than the current serving beam if the first measured value is less than or equal to a beam measurement threshold, to obtain the second measured value.

In some embodiments, when the first measurement granularity is a cell measurement granularity, the measurement object is a cell-specific reference signal (CRS).

In some embodiments, in some embodiments, the first message may further include at least one of measurement report configuration information, a measurement identifier, and measurement quantity configuration information.

In some embodiments, when the first measurement granularity is a beam measurement granularity, the measurement report configuration information is used to instruct the terminal device to send a measured value of each of N beams and/or a combined value of measured values of the N beams in a measurement report.

In some embodiments, a quantity of N is configured by the access network device, and N is a positive integer greater than or equal to 1.

It should be understood that, the combined value of measured values of the N beams is a value obtained by the terminal device in a first preset manner. The first preset manner may be a plurality of manners in the prior art. For example, the first preset manner may be performing weighted summation on the N measured values, to obtain the combined value, or the first preset manner may be averaging the N measured values, to obtain the combined value.

It should be further understood that, the measured values of the N beams may include the first measured value and the second measured value, that is, may be a measured value of the current serving beam, or may be a measured value of another beam other than the current serving beam.

In some embodiments, the terminal device may obtain the measured value in a plurality of manners. For example, the terminal device may use a layer 2 combination and/or layer 2 filtering manner. For example, the layer 2 may be a media access control (MAC) layer, a radio link control (RLC) layer, or a packet data convergence protocol (PDCP) layer, to obtain a measured value of a BRS of the current serving beam and a measured value of a BRS of another beam other than the current serving beam.

It should be understood that, the measured values of the N beams included in the measurement report may be a result selected by the terminal device. For example, the terminal device selects measured values of first N beams that have largest measured values in all beams. Alternatively, the measured values of the N beams included in the measurement report may be a result selected by the terminal device based on a first preset condition preconfigured by the access network device. For example, the first preset condition may be that a measured value of each of the N beams is greater than or equal to a first threshold, and the first threshold may be configured by the access network device.

In some embodiments, when a quantity of corresponding beams whose measured values are greater than or equal to a first threshold is greater than N, the measured values of first N beams in the corresponding beams whose measured values are greater than or equal to the first threshold may be selected as content of the measurement report.

It should be understood that, when the first measurement granularity is a beam measurement granularity, the terminal device may report, when reporting a measurement result to the access network device, a measured value of each of the selected N beams to the access network device, so that the access network device determines, based on the measured value, whether to switch the current serving beam. In other words, the measurement report configuration information instructs the terminal device to send the measured value of each of the N beams in the measurement report. The terminal device may alternatively combine the measured values of the N beams into a combined value, and then report the combined value to the access network device. In other words, the measurement report configuration information instructs the terminal device to send the combined value of the measured values of the N beams in the measurement report. The method in which the terminal device combines the measured values of the N beams to obtain the combined value may be any one of a plurality of methods in the prior art. For example, the method may be performing weighted summation on the N measured values or averaging the N measured values. This is not limited in this embodiment of this disclosure. The terminal device may further simultaneously report the measured values of the N beams and the combined value of the measured values of the N beams to the access network device. In other words, the measurement report configuration information may further instruct the terminal device to send the measured value of each of the N beams and the combined value of the measured values of the N beams in the measurement report.

In some embodiments, when the first measurement granularity is a beam measurement granularity and the beam is actually a beam group including a plurality of beams, the measurement report configuration information may instruct the terminal device to send, in the measurement report, measured values of M beams and a measured value of each beam in the beam group in which the M beams are located.

In some embodiments, when the measurement granularity is actually a beam group measurement granularity, the measurement report configuration information may further instruct the terminal device to send, in the measurement report, the measured values of the M beams and a combined value of measured values of all beams in the beam group in which the M beams are located.

In some embodiments, a quantity of M is configured by the access network device, and M is a positive integer greater than or equal to 1.

In some embodiments, the combined value of the measured values of all the beams in the beam group in which the M beams are located may be obtained by calculation in a second preset manner.

In some embodiments, the second preset manner may be a plurality of manners in the prior art. For example, the second preset manner may be performing weighted summation on the M measured values, to obtain the combined value, or the second preset manner may be averaging the M measured values, to obtain the combined value.

For example, a quantity of M configured by the access network device to the terminal device is three, and two of the three beams are from a first beam group, and the other beam is from a second beam group. In this case, the measurement report reported by the terminal device to the access network device includes measured values of the three beams and a measured value of each beam in the first beam group and the second beam group in which the three beams are located. Alternatively, the measurement report reported by the terminal device to the access network device includes measured values of the three beams, a combined value of measured values of all beams in the first beam group in which the three beams are located, and a combined value of measured values of all beams in the second beam group in which the three beams are located.

In some embodiments, when the measurement granularity is actually a beam group measurement granularity, the measurement report configuration information may further instruct the terminal device to send, in the measurement report, the measured values of the M beams and a measured value of each beam in all beam groups.

In some embodiments, when the measurement granularity is actually a beam group measurement granularity, the measurement report configuration information may further instruct the terminal device to send, in the measurement report, the measured values of the M beams and a combined value of measured values of all beams in all the beam groups.

In some embodiments, the combined value of the measured values of all the beams in all the beam groups may be obtained by calculation in a third preset manner.

In some embodiments, the third preset manner may be a plurality of manners in the prior art. For example, the third preset manner may be performing weighted summation on the measured values of all beams in beam groups of all cells, to obtain the combined value, or the third preset manner may be averaging the measured values of all beams in beam groups of all cells, to obtain the combined value.

For example, a quantity of M configured by the access network device to the terminal device is three, and a total of four beam groups currently exist. In this case, the measurement report reported by the terminal device to the access network device includes measured values of three beams having largest measured values in the four beam groups and a measured value of each beam in the currently existing four beam groups. Alternatively, the measurement report reported by the terminal device to the access network device includes measured values of three beams having largest measured values and a combined value of measured values of all beams in the current existing four beam groups.

It should be understood that, the first preset manner, the second preset manner, and the third preset manner may be a same calculation manner, or may be different calculation manners. This is not limited in this embodiment of this disclosure.

It should be understood that, the beam groups of all cells are all beam groups in a serving cell in which the terminal device is located and in another cell other than the serving cell, that is, beam groups in a serving cell in which a current serving beam group of the terminal device is located and beam groups in another cell other than the current serving cell are included.

It should be understood that, during measurement reporting configuration, a quantity of measured values of the current serving beam group included in the measurement report sent by the terminal device to the access network device may be the same as, or may be different from a quantity of measured values of another beam group. This is not limited in this embodiment of this disclosure.

In some embodiments, the measured values of M beams included in the measurement report may be a result selected by the terminal device, or may be a result selected by the terminal device based on a second preset condition preconfigured by the access network device. For example, the second preset condition may be that a measured value of each of the M beams is greater than or equal to a second threshold, and the second threshold may be configured by the access network device.

In some embodiments, the measurement report configuration information may further include reporting manner configuration information. The reporting manner configuration information is used to indicate a manner in which the terminal device reports the measurement report to the access network device. The reporting manner configuration information may include a plurality of reporting manners such as event trigger reporting, periodical reporting, and event-triggered periodical reporting.

In some embodiments, a measurement identifier included in the first message is used to indicate a correspondence between the measurement object and the measurement report configuration information, to link the measurement object with the measurement report configuration information corresponding thereto.

That is, during measurement reporting, the terminal device evaluates and reports, based on a measurement identifier, a measured value of the measurement object corresponding to the measurement report configuration information in the measurement identifier by using the corresponding measurement report configuration information.

In addition, the measurement identifier is further used to uniquely identify measurement reporting of different air interfaces. That is, the access network device uses the measurement identifier included in the measurement report by the terminal device, to determine the cell or beam whose measurement information is currently reported by the terminal device.

It should be understood that, a plurality of measurement identifiers may correspond to a plurality of measurement objects and same measurement report configuration information, or a plurality of measurement identifiers may correspond to one measurement object and a plurality of pieces of measurement report configuration information.

In some embodiments, measurement quantity configuration information included in the first message is used to indicate a related coefficient for layer 3 filtering, including a related coefficient required for intra-frequency and inter-frequency measurement. It should be understood that the related coefficient is used for processing a measurement value.

It should be understood that, when the first measurement granularity is a cell measurement granularity, the measurement report configuration information, the measurement identifier, and the measurement quantity information that are included in the first message share a same function with those in the prior art. For brevity, details are not described herein again.

In some embodiments, the first message may include information about a current serving beam and information about another beam other than the current serving beam. When the first measured value obtained by measuring the current serving beam by the terminal device is less than or equal to a measurement threshold, in this case, the terminal device needs to measure the another beam. Because the first message sent by the access network device to the terminal device includes configuration information of the another beam, the terminal device may determine the another to-be-measured beam based on the beam identifier of one or more beams in the information, measure the another beam based on other configuration information, and send, based on the measurement report configuration information, the measured value to the terminal device in a form of a measurement report.

For example, the first measurement granularity indicated by the measurement type information included in the first message sent by the access network device is a beam measurement granularity. In this case, the terminal device measures the current serving beam based on the first measurement granularity, to obtain the first measured value; and after obtaining the first measured value, the terminal device compares the first measured value with the measurement threshold in the first message. When the first measured value is less than or equal to the measurement threshold, the terminal device determines another to-be-measured one or more beams based on a beam identifier of the another one or more beams included in the first message, measures some or all of the another one or more beams, to obtain the second measured value, configures the measurement report based on the measurement report configuration information, and sends the configured measurement report to the access network device.

It should be understood that, when a measured value is greater than or equal to a measurement threshold corresponding thereto, for example, when a measured value of the current serving cell is greater than or equal to a cell measurement threshold or a measured value of the current serving beam is greater than or equal to a beam measurement threshold, measurement of another cell or another beam may not be performed, thereby reducing unnecessary measurements, improving measurement efficiency, and saving energy.

In some embodiments, the first message may include only information related to the current serving beam. For example, the first message may include only the measurement type information, the measurement object corresponding to the first measurement granularity indicated by the measurement type information, the measurement threshold, and the like. In this case, after obtaining the first measured value by measuring the measurement object corresponding to the first measurement granularity, the terminal device compares the first measured value with the measurement threshold corresponding to the first measurement granularity included in the first message, and when the first measured value is less than the measurement threshold, determines that another cell or another beam other than the current serving cell or the current serving beam needs to be measured. However, in this case, the first message does not include configuration information of the another cell or the another beam, and the terminal device needs to request configuration information of the another cell or the another beam from the access network device.

For example, the measurement granularity indicated by the measurement type information included in the first message sent by the access network device to the terminal device is a beam measurement granularity. The first message further includes information about the measurement threshold of the current serving beam, the measurement report configuration information, and the like. After receiving the foregoing message, the terminal device measures the current serving beam based on the first measurement granularity indicated by the measurement type information included in the first message, to obtain the first measured value, and after obtaining the first measured value, the terminal device compares the first measured value with the measurement threshold, to determine another beam needs to be measured.

Because the first message sent by the access network device to the terminal device includes only configuration information of the current serving beam, when the first measured value is less than the measurement threshold, the terminal device needs to measure some or all of another one or more beams other than the current serving beam. However, the access network device does not send configuration information of another beam to the terminal device. In this case, the terminal device may send a configuration request message to the access network device, to request the access network device to send the configuration information of another beam other than the current serving beam to the terminal device.

After receiving the configuration request message sent by the terminal device, the access network device sends a second message to the terminal device, and the second message includes a beam identifier of the another one or more beams, and other configuration information of the another one or more beams, for example, measurement report configuration information and measurement quantity configuration information.

It should be understood that, when the first measurement granularity is a cell measurement granularity, the second message sent by the access network device to the terminal device based on the configuration request message sent by the terminal device includes cell identifiers of one or more other cells, and the cell identifiers are used to enable the terminal device to identify other cells that need to be measured by the terminal device, and other configuration information of the one or more cells.

The sending, by the access network device, the second message to the terminal device includes two cases.

First, when sending the first message to the terminal device, the access network device already configures the second message, but does not simultaneously send the second message with the first message to the terminal device.

In this case, after receiving the configuration request message sent by the terminal device, the access network device may directly send the second message to the terminal device, to enable the terminal device to measure another beam.

Second, when sending the first message to the terminal device, the access network device does not configure the second message.

In this case, after receiving the configuration request message sent by the terminal device, the access network device may first configure the second message, and send the second message to the terminal device after the second message is configured.

In some embodiments, the second message may be a physical downlink control channel (PDCCH) message, or a medium access control control element (MAC CE) message, or a radio resource control (RRC) message.

In some embodiments, the configuration request message may be a physical downlink control channel (PDCCH) message, or a medium access control control element (MAC CE) message, or a radio resource control (RRC) message or an on-demand system information request on-demand SI request, where the on-demand SI request may be sent by a random access Msg 1 or Msg 3.

It should be understood that, when the access network device sends only the first message of the current serving cell or the current serving beam to the terminal device, the terminal device may compare the measured value of the current serving cell or the current serving beam with the corresponding measurement threshold, and need to measure another cell or another beam when the measured value is less than the measurement threshold. In this case, the terminal device then sends the configuration request message to the access network device, to request the access network device to configure the terminal device, that is, configure based on demands, thereby reducing signaling overheads.

For example, the current measurement granularity is a beam measurement granularity. When starting to configure the measurement information, the access network device not only configures measurement configuration information of the current serving beam, but also configures measurement configuration information of another beam other than the current serving beam. However, considering a factor such as a capacity of the current terminal device, for example, the current terminal device is in a static state, a probability that the terminal device moves to a range of another beam is extremely low. Therefore, to reduce signaling overheads, the access network device does not send the configuration information of another beam to the terminal device. When the measured value of the current serving beam is less than a measurement threshold, for example, when the terminal device changes from a static state to a moving state, signal quality of the current serving beam is not good for the terminal device, and the current serving beam needs to be switched to a target beam having relatively good signal quality. In this case, the terminal device needs to measure another beam other than the current serving beam. However, because the access network device does not configure configuration information of another beam to the terminal device, the terminal device may send the configuration request message to the access network device, to request the access network device to configure the configuration information of another beam to the terminal device.

In some embodiments, after obtaining a measured value (including a first measured value and a second measured value), the terminal device sends, based on measurement report configuration information sent by the access network device, a measurement report to the access network device.

In some embodiments, when the first measurement granularity is a beam measurement granularity, and the beam is one beam, the measurement report includes N measured values and/or a combined value of the N measured values, and the N measured values have a one-to-one correspondence with the N beams.

In some embodiments, a quantity of N is configured by the access network device, and the N measured values are greater than or equal to a first threshold.

In some embodiments, when the first measurement granularity is a beam measurement granularity and the beam includes a plurality of beams, the measurement report may further include a measured value of each of M beams and a measured value of each beam in a beam group in which the M beams are located, or include a measured value of each of M beams and a combined value of measured values of all beams in a beam group in which the M beams are located.

In some embodiments, when the first measurement granularity is a beam measurement granularity and the beam includes a plurality of beams, the measurement report may include a measured value of each of M beams and a measured value of each beam in all beam groups, or include a measured value of each of M beams and a combined value of measured values of all beams in all beam groups.

In some embodiments, after receiving the measurement report sent by the terminal device, the access network device sends, based on the measurement report and/or a switching mechanism pre-stipulated by the access network device, a third message to the terminal device. The third message includes switching indication information, to instruct the terminal device to switch the current serving cell or the current serving beam to a target cell or a target beam indicated by the switching indication information.

In some embodiments, the third message may be a PDCCH message, a MAC CE message, or an RRC message.

It should be understood that, in this embodiment of this disclosure, the measurement method in which the first measurement granularity is the beam measurement granularity is mainly described in detail, and the measurement method in which the first measurement granularity is the cell measurement granularity is the same as or similar to the foregoing method. For brevity, details are not described again.

In this embodiment of this disclosure, by introducing different measurement types, measurement of different granularities may be implemented, so that the measurement granularity is more refined and measurement results are more accurate.

FIG. 2 is a schematic flowchart of a measurement method 200 according to an embodiment of this disclosure. The method 200 is described by using an example in which a measurement granularity is a beam measurement granularity, and the method is not limited thereto. As shown in FIG. 2, the method 200 includes the following operations.

210. A terminal device receives a first message sent by an access network device.

The first message includes measurement type information, the measurement type information is used to indicate a first measurement granularity, and the first measurement granularity is a beam measurement granularity.

It should be understood that, when the first measurement granularity is a beam measurement granularity, the beam may be one beam, or a beam group formed by a plurality of beams or a TRP. Therefore, when the first measurement granularity is a beam measurement granularity, the measurement granularity in this case may actually be any one of a beam measurement granularity, a beam group measurement granularity and a TRP measurement granularity.

In some embodiments, the first message includes measurement type information, information related to a current serving beam, and information related to another one or more beams other than the current serving beam.

In some embodiments, the first message may be carried by a connection reconfiguration message of radio resource control (RRC), and sent by the access network device to the terminal device, or may be carried by another RRC signaling and sent by the access network device to the terminal device. This is not limited in this embodiment of this disclosure.

In some embodiments, the first message may be a physical downlink control channel (PDCCH) message, or a medium access control control element (MAC CE) message.

In some embodiments, the first message may further include a measurement threshold corresponding to the first measurement granularity. The measurement threshold has a same function as the measurement threshold in the prior art, and is used to be compared with a measured value of a current serving cell in which the terminal device is located or a measured value of a current serving beam, to determine whether another cell or another beam needs to be measured.

However, in this embodiment of this disclosure, for different measurement granularities, the measurement threshold may be different. For example, when the first measurement granularity is a cell measurement granularity, the measurement threshold corresponds to a cell measurement threshold, and when the first measurement granularity is a beam measurement granularity, the measurement threshold corresponds to a beam measurement threshold. The cell measurement threshold and the beam measurement threshold may be different, and certainly a case in which the two values are the same may exist. This is not limited in this embodiment of this disclosure.

In some embodiments, the measurement threshold is a measurement threshold of the current serving cell or the current serving beam, and a measurement threshold may not be set for another cell or another beam.

In some embodiments, when the first measurement granularity is a beam measurement granularity, the first message further includes a beam identifier of one or more beams, the beam identifier is used to indicate different beams, and the one or more beams are other beams other than the current serving beam in the beams.

In some embodiments, the first message may alternatively include a beam identifier of the current serving beam.

In some embodiments, the first message may further include a measurement object, and when the first measurement granularity is a beam measurement granularity, the measurement object may include the current serving beam, or may include another one or more beams other than the current serving beam.

In other words, the measurement object included in the first message may be a reference signal of the current serving beam, or may be a reference signal of the another one or more beams other than the current serving beam.

In some embodiments, the reference signal may be referred to as a beam reference signal (BRS), and the BRS may be a channel state information-reference signal (CSI-RS), may be a demodulation reference signal (DM-RS), or may be a synchronization signal block (SS block), or another reference signal. This embodiment of this disclosure is not limited thereto.

In some embodiments, the terminal device measures a reference signal of the current serving beam, to obtain a first measured value; and measures a reference signal of some or all of another one or more beams other than the current serving beam, to obtain a second measured value.

It should be understood that, because a reference signal of some or all of another one or more beams other than the current serving beam is measured, to obtain a second measured value, the second measured value may be one or more values.

In some embodiments, when the first measurement granularity is a cell measurement granularity, the measurement object is a cell-specific reference signal, including a reference signal of the current serving cell, and a reference signal of another cell other than the current serving cell.

In some embodiments, the first message may further include at least one of measurement report configuration information, a measurement identifier, and measurement quantity configuration information.

In some embodiments, when the first measurement granularity is a beam measurement granularity, the measurement report configuration information is used to instruct the terminal device to send a measured value of each of N beams and/or a combined value of measured values of the N beams in a measurement report.

In some embodiments, a quantity of N is configured by the access network device, and N is a positive integer greater than or equal to 1.

It should be understood that, the combined value of measured values of the N beams is a value obtained by the terminal device in a first preset manner. The first preset manner may be a plurality of manners in the prior art. For example, the first preset manner may be performing weighted summation on the N measured values, to obtain the combined value, or the first preset manner may be averaging the N measured values, to obtain the combined value.

It should be further understood that, the measured values of the N beams may include the first measured value and the second measured value, that is, may be the measured value of the current serving beam, or may be the measured value of another beam other than the current serving beam.

In some embodiments, the terminal device may obtain the measured value in a plurality of manners. For example, the terminal device may use a layer 2 combination and/or layer 2 filtering manner. For example, the layer 2 may be a media access control (MAC) layer, a radio link control (RLC) layer, or a packet data convergence protocol (PDCP) layer, to obtain a measured value of a BRS of the current serving beam and a measured value of a BRS of another beam other than the current serving beam.

It should be understood that, the measured values of the N beams included in the measurement report may be a result selected by the terminal device. For example, the terminal device selects measured values of first N beams that have largest measured values in all beams. Alternatively, the measured values of the N beams included in the measurement report may be a result selected by the terminal device based on a first preset condition preconfigured by the access network device. For example, the first preset condition may be that a measured value of each of the N beams is greater than or equal to a first threshold, and the first threshold may be configured by the access network device.

In some embodiments, when a quantity of corresponding beams whose measured values are greater than or equal to a first threshold is greater than N, the measured values of first N beams in the corresponding beams whose measured values are greater than or equal to the first threshold may be selected as content of the measurement report.

It should be understood that, when the first measurement granularity is a beam measurement granularity, the terminal device may report, when reporting a measurement result to the access network device, a measured value of each of the selected N beams to the access network device, so that the access network device determines, based on the measured value, whether to switch the current serving beam. In other words, the measurement report configuration information instructs the terminal device to send the measured value of each of the N beams in the measurement report. The terminal device may alternatively combine the measured values of the N beams into a combined value, and then report the combined value to the access network device. In other words, the measurement report configuration information instructs the terminal device to send the combined value of the measured values of the N beams in the measurement report. The method in which the terminal device combines the measured values of the N beams to obtain the combined value may be any one of a plurality of methods in the prior art. For example, the method may be performing weighted summation on the N measured values or averaging the N measured values. This is not limited in this embodiment of this disclosure. The terminal device may further simultaneously report the measured values of the N beams and the combined value of the measured values of the N beams to the access network device. In other words, the measurement report configuration information may further instruct the terminal device to send the measured value of each of the N beams and the combined value of the measured values of the N beams in the measurement report.

In some embodiments, when the first measurement granularity is a beam measurement granularity and the beam is actually a beam group including a plurality of beams, the measurement report configuration information may instruct the terminal device to send, in the measurement report, measured values of M beams and a measured value of each beam in the beam group in which the M beams are located.

In some embodiments, when the measurement granularity is actually a beam group measurement granularity, the measurement report configuration information may further instruct the terminal device to send, in the measurement report, the measured values of the M beams and a combined value of measured values of all beams in the beam group in which the M beams are located.

In some embodiments, a quantity of M is configured by the access network device, and M is a positive integer greater than or equal to 1.

In some embodiments, the combined value of the measured values of all the beams in the beam group in which the M beams are located may be obtained by calculation in a second preset manner.

In some embodiments, the second preset manner may be a plurality of manners in the prior art. For example, the second preset manner may be performing weighted summation on the M measured values, to obtain the combined value, or the second preset manner may be averaging the M measured values, to obtain the combined value.

For example, a quantity of M configured by the access network device to the terminal device is three, and two of the three beams are from a first beam group, and the other beam is from a second beam group. In this case, the measurement report reported by the terminal device to the access network device includes measured values of the three beams and a measured value of each beam in the first beam group and the second beam group in which the three beams are located. Alternatively, the measurement report reported by the terminal device to the access network device includes measured values of the three beams, a combined value of measured values of all beams in the first beam group in which the three beams are located, and a combined value of measured values of all beams in the second beam group in which the three beams are located.

In some embodiments, when the measurement granularity is actually a beam group measurement granularity, the measurement report configuration information may further instruct the terminal device to send, in the measurement report, the measured values of the M beams and a measured value of each beam in all beam groups.

In some embodiments, when the measurement granularity is actually a beam group measurement granularity, the measurement report configuration information may further instruct the terminal device to send, in the measurement report, the measured values of the M beams and a combined value of measured values of all beams in all the beam groups.

In some embodiments, the combined value of the measured values of all the beams in all the beam groups may be obtained by calculation in a third preset manner.

In some embodiments, the third preset manner may be a plurality of manners in the prior art. For example, the third preset manner may be performing weighted summation on the measured values of all beams in beam groups of all cells, to obtain the combined value, or the third preset manner may be averaging the measured values of all beams in beam groups of all cells, to obtain the combined value.

For example, a quantity of M configured by the access network device to the terminal device is three, and a total of four beam groups currently exist. In this case, the measurement report reported by the terminal device to the access network device includes measured values of three beams having largest measured values in the four beam groups and a measured value of each beam in the currently existing four beam groups. Alternatively, the measurement report reported by the terminal device to the access network device includes measured values of three beams having largest measured values and a combined value of measured values of all beams in the current existing four beam groups.

It should be understood that, the first preset manner, the second preset manner, and the third preset manner may be a same calculation manner, or may be different calculation manners. This is not limited in this embodiment of this disclosure.

It should be understood that, the beam groups of all cells are all beam groups in a serving cell in which the terminal device is located and in another cell other than the serving cell, that is, beam groups in a serving cell in which a current serving beam group of the terminal device is located and beam groups in another cell other than the current serving cell are included.

It should be understood that, during measurement reporting configuration, a quantity of measured values of the current serving beam group included in the measurement report sent by the terminal device to the access network device may be the same as, or may be different from a quantity of measured values of another beam group. This is not limited in this embodiment of this disclosure.

In some embodiments, the measured values of M beams included in the measurement report may be a result selected by the terminal device, or may be a result selected by the terminal device based on a second preset condition preconfigured by the access network device. For example, the second preset condition may be that a measured value of each of the M beams is greater than or equal to a second threshold, and the second threshold may be configured by the access network device.

In some embodiments, the measurement report configuration information may further include reporting manner configuration information. The reporting manner configuration information is used to indicate a manner in which the terminal device reports the measurement report to the access network device. The reporting manner configuration information may include a plurality of reporting manners such as event trigger reporting, periodical reporting, and event-triggered periodical reporting.

In some embodiments, a measurement identifier included in the first message is used to indicate a correspondence between the measurement object and the measurement report configuration information, to link the measurement object with the measurement report configuration information corresponding thereto.

That is, during measurement reporting, the terminal device evaluates and reports, based on the measurement identifier, a measured value of the measurement object corresponding to the measurement report configuration information in the measurement identifier by using the corresponding measurement report configuration information.

In addition, the measurement identifier is further used to uniquely identify measurement reporting of different air interfaces. That is, the access network device uses the measurement identifier included in the measurement report by the terminal device, to determine the cell or beam whose measurement information is currently reported by the terminal device.

It should be understood that, a plurality of measurement identifiers may correspond to a plurality of measurement objects and same measurement report configuration information, or a plurality of measurement identifiers may correspond to one measurement object and a plurality of pieces of measurement report configuration information.

In some embodiments, measurement quantity configuration information included in the first message is used to indicate a related coefficient for layer 3 filtering, including a related coefficient required for intra-frequency and inter-frequency measurement. It should be understood that the related coefficient is used for processing the measurement value.

It should be understood that, in the method 200, a process of interaction between the terminal device and the access network device is described only by using an example in which the first measurement granularity is a beam measurement granularity. However, this embodiment of this disclosure is not limited thereto. This embodiment of this disclosure may further include a measurement method of a cell measurement granularity and a TRP measurement granularity.

In some embodiments, before the terminal device performs measurement, the terminal device needs to perform random access.

Performing random access may be divided into the following several operations.

1. Random Access Resource Configuration and Selection

In some embodiments, the terminal device first needs to perform downlink synchronization, to receive a broadcast message broadcast by the access network device, and the broadcast message includes a correspondence between a downlink beam and a random access resource configuration.

In some embodiments, the random access resource configuration includes a time-frequency resource and/or preamble division information required for a random access process.

In some embodiments, in the random access process, the terminal device first measures the downlink beam based on measurement configuration information sent by the access network device, determines, based on a measurement result, a downlink beam having best signal quality when the terminal device receives a random access response (RAR) message, and then determines the random access resource configuration based on the correspondence that is between the downlink beam and the random access resource configuration and that is included in the received broadcast message, where the random access resource configuration includes a random access preamble and/or a time-frequency resource required for the random access process; and sends the preamble on the corresponding random access time-frequency resource. After receiving the preamble on the random access time-frequency resource, the access network device determines, based on the correspondence between the downlink beam on which the received preamble is located and the random access resource configuration, a downlink beam that sends a RAR message, where the RAR message carries uplink timing advance (TA) that sends a Msg 3, an uplink resource (for example, a time-frequency resource) that sends the Msg 3, and the like.

The Msg 3 is a collective name for information of one type. In different random access scenarios, content included in the Msg 3 is different. In some embodiments, the Msg 3 may include an RRC message, for example, an RRC connection setup request message or an RRC connection reestablishment message, or an on-demand system information request (on-demand SI request). Alternatively, the Msg 3 may further include a MAC CE, for example, a MAC CE used to report a buffer status report BSR, or a MAC CE used to report a beam failure recovery request.

In some embodiments, the correspondence that is between the downlink beam and the random access resource and that is included in the broadcast message received by the terminal device may be a correspondence that is between an SS block and the random access time-frequency resource and/or a set of random access preambles and that is configured by the access network device.

In some embodiments, the correspondence that is between the downlink beam and the random access resource and that is included in the broadcast message received by the terminal device may alternatively be a correspondence that is between a CSI-RS and the random access time-frequency resource and/or a set of random access preambles and that is configured by the access network device.

In some embodiments, the correspondence that is between the downlink beam and the random access resource and that is included in the handover message received by the terminal device may be a correspondence that is between an SS block and the random access time-frequency resource and/or a set of random access preambles and that is configured by the access network device, and the handover message includes a specialized resource used for random access, where the specialized resource includes a time domain/frequency domain/code domain resource.

In some embodiments, the correspondence that is between the downlink beam and the random access resource and that is included in the handover message received by the terminal device may alternatively be a correspondence that is between a CSI-RS and the random access time-frequency resource and/or a set of random access preambles and that is configured by the access network device, and the handover message includes a specialized resource used for random access, where the specialized resource includes a time domain/frequency domain/code domain resource.

In the foregoing embodiments, the time domain resource may be one or more random access transmission occasions (RACH transmission occasions), the frequency domain resource may be one or more physical random access PRACH resource locations, where the PRACH locations may be continuous or may be discontinuous, and the code domain resource may be one or more preambles.

2. Msg 2

(a) Content of the Msg 2

The Msg 2 is a random access response RAR message sent by the access network device to the terminal device. The RAR message includes at least information such as timing advance TA, uplink grant UL grant, and a temporary cell radio network temporary identifier (TC-RNTI).

In some embodiments, the terminal device may send, based on the information (for example, the foregoing timing advance TA, and the uplink grant resource UL grant) carried in the Msg 2 sent by the access network device, a Msg 3 to the access network device.

In some embodiments, if the Msg 1 is used to send the on-demand system information SI, content of the RAR may be empty, that is, the RAR message does not carry any indication information. In this case, the terminal device does not need to perform Msg 3 operation and Msg 4 operation.

In some embodiments, in a 5G potential random access disclosure scenario (that is, using the Msg 1 to send a beam failure recovery request beam failure recovery request), a bit domain of the UL grant indicated by the RAR may be greater than a corresponding bit domain in LTE. In this case, the terminal device may use the TA and the UL grant carried in the RAR to send information such as a beam measurement report.

In some embodiments, in some contention-free random access scenarios, for example, in an RRC connected mode, downlink data arrives, but uplink is out of synchronization. When random access needs to be performed again, because the Msg 3 does not need to be sent in this case, the RAR may not carry the UL grant.

In some embodiments, in some contention-free random access scenarios, for example, in a switching scenario, the terminal device has allocated the C-RNTI, and the access network device does not need to carry the TC-RNTI, so that the RAR in this case may not carry the TC-RNTI.

(b) RAR Receiver Window Startup

In the prior art, after sending the Msg 1, the terminal device starts the RAR receiver window after a fixed period of time. For the LTE, the fixed time of the receiver window is three subframes. If the terminal device is a narrow band Internet of Things (NB-IoT) device based on a cellular network, the RAR receiver window is started after a subframe repeated after a last preamble plus 41 subframes.

In some embodiments, if there is a correspondence between a downlink beam and a preamble and/or PRACH, the terminal device needs to first determine a downlink beam that receives the RAR message, then start the RAR message receiver window after a period of time after the Msg 1 is sent, and listen to the downlink beam in duration of the RAR message receiver window, and after detecting a RAR message that belongs to the terminal device (where an RAPID in a subcarrier corresponding to the RAR is the same as a preamble sent by the terminal device), the terminal device may send the Msg 3 to the access network device by using the information carried in the RAR message, where the beam that sends the Msg 3 may be the same as, or may be different from the beam that sends the Msg 1, and this depends on the UE for implementation.

In some embodiments, if the terminal device is allowed to send a plurality of Msgs 1 to the access network device in one RAR, possible cases in which the terminal device starts the RAR receiver window may be as follows:

1: after the terminal device sends a first Msg 1, the RAR receiver window is started;

2: after the terminal device sends a last Msg 1, the RAR receiver window is started; or 3: the corresponding RAR receiver window is started each time a Msg 1 is sent.

(c) RA-RNTI Used to Listen to the RAR

For the cases in which the terminal device is allowed to send a plurality of Msgs 1 in one RAR in b, possible cases of the RA-RNTI used to listen to the RAR may be as follows:

1: one default RA-RNTI is used; or

2: an existing RA-RNTI calculation formula is used to calculate RA-RNTIs corresponding to time-frequency resource locations when the Msgs 1 are sent for a plurality of times, and the plurality of RA-RNTIs are used to listen to the RAR.

(d) RAR Receiving

For the case in which the plurality of Msgs 1 may be replied to in one RAR window, when receiving the plurality of Msgs 1, the access network device may reply to only one Msg 1, or reply to each Msg 1 with one RAR. Correspondingly, the terminal device stops receiving the RAR once one RAR is received, and considers that the RAR is successfully received.

3. Msg 3 and Msg 4

The Msg 3 is a collective name for information of one type. In different random access scenarios, content included in the Msg 3 is different, and examples are described in the following.

In some embodiments, the Msg 3 may include an RRC message, for example, an RRC connection setup request message or an RRC connection reestablishment message, or an on-demand system information (SI) request. Alternatively, the Msg 3 may include a MAC CE, for example, a MAC CE used to report a buffer status report BSR, or a MAC CE used to report a beam failure recovery request.

In some embodiments, before receiving the RAR message that belongs to the terminal device, the terminal device is allowed to send the Msg 1 on a plurality of beams, and the RAR message may carry information about an uplink beam having best signal quality. In this case, the Msg 3 may be sent by using the best uplink beam. Otherwise, if the RAR message does not carry information about a beam having best signal quality, an uplink beam suitable to send the Msg 3 depends on UE for implementation.

When the Msg 3 is successfully sent, that is, neither a conflict nor error reporting occurs in a process of sending the Msg 3, it is considered that the random access of the terminal device is successful, and the terminal device can enter the connected mode; otherwise, when the Msg 3 fails to be sent, the access network device sends a contention resolution through the Msg 4, to inform that the random access is a failure and the random access needs to be performed again. The Msg 4 is a contention resolution message sent by the access network device to the terminal device, and the contention resolution message is used to inform the terminal device that the random access is a failure, and the terminal device needs to perform the random access again.

4. Random Access is Performed Again

When re-initiating the random access, the UE needs to increase a Msg 1 transmit power based on a preset power ramping mechanism, thereby improving a random access success probability. Power ramping parameters corresponding to different beams may be same, or may be different. The power ramping parameter is mainly a power ramping step powerRampingStep, that is, increased power amplitude each time the random access is re-initiated, and/or a maximum transmit power (when the maximum transmit power is reached, the maximum transmit power is maintained and ramping is no longer performed), and a preamble target received power preambleInitialReceivedTargetPower and the like. DELTA_PREAMBLE is an offset parameter related to the power ramping and associated with a preamble sending format, and may be obtained by table lookup.

A beam used to re-send the Msg 1 may be the same as, or may be different from the beam previously used to send the Msg 1, and this depends on the UE for implementation. That is, the UE may switch the beam, or may not switch the beam.

When the transmit power of the Msg 1 is increased, the terminal device needs to maintain a counter POWER_POWERING_COUNTER related to the power ramping, and the counter may be the same as, or may be different from a counter PREAMBLE_TRANSMISSION_COUNTER related to a quantity of times of preamble transmission.

The following separately describes, based on whether the power ramping counter and the preamble transmission counter are distinguished from each other, and whether sending of a plurality of Msgs 1 in the RAR window is considered, several cases of the power ramping mechanism.

Case 1: Two counters are separately maintained, and the sending of the plurality of Msgs 1 in the RAR window is not considered.

(1) Parameter Maintenance

In some embodiments, the terminal device separately maintains the counter POWER_POWERING_COUNTER related to the power ramping and the counter PREAMBLE_TRANSMISSION_COUNTER related to the quantity of times of preamble transmission. Functions of the two counters are different, where the counter related to the power ramping is configured for the terminal device to calculate the power, and the counter related to the quantity of times of preamble transmission is configured to determine whether a limit on a maximum times of preamble transmission is exceeded, and if the maximum times of preamble transmission is exceeded, a MAC entity needs to indicate to an upper layer that the problem of random access occurs.

When the random access process is initialized, the two counters are both set to 0, and then based on whether an uplink beam that sends the Msg 1 changes, an increase of the counter value is maintained. After the random access process ends (the random access is a success or the random access is a failure because a maximum times of preamble transmission is reached), the values of the foregoing two counters are reset to 0.

(2) Power Ramping Formula

The preamble target received power PREAMBLE_RECEIVED_TARGET_POWER may be calculated based on the power ramping formula, and the power ramping formula may be as follows:

$$\text{preambleInitialReceivedTargetPower} + \text{DELTA\_PREAMBLE} + (\text{POWER\_POWERING\_COUNTER} - 1) * \text{powerRampingStep} \quad (1)$$

preambleInitialReceivedTargetPower is a preamble initial transmit power, and powerRampingStep is a power ramping step, and the two parameters may be sent by the access network device to the terminal device through a system message.

DELTA_PREAMBLE is related to a preamble sending format (Preamble Format), and the preamble format may be indicated by a parameter prach-ConfigIndex in random access configuration.

By using the LTE as an example, Table 1 is a table about DELTA_PREAMBLE values, and the DELTA_PREAMBLE values may be obtained by table lookup based on the preamble sending format.

TABLE 1

| DELTA_PREAMBLE Values | |
| --- | --- |
| Preamble Sending Format | DELTA_PREAMBLE Value |
| 0 | 0 dB |
| 1 | 0 dB |
| 2 | −3 dB |
| 3 | −3 dB |
| 4 | 8 dB |

As shown in the power ramping formula (1), the transmit power of the Msg 1 may be determined based on different parameters related to the power ramping, so that the terminal device is enabled to learn of the transmit power of the current Msg 1, and the terminal device performs random access again based on the transmit power of the Msg 1.

When the beam that sends the Msg 1 is the same as the beam previously used to send the Msg 1, a value of a counter (POWER_POWERING_COUNTER) related to the power ramping used for the power ramping is increased by 1, and the power is increased based on the power ramping step corresponding to the beam. When the retransmission beam changes, the value of the counter (POWER_POWERING_COUNTER) related to the power ramping used for the power ramping remains unchanged, and the power is increased based on the power ramping step corresponding to the retransmission beam.

The power ramping method introduces a counter (POWER_POWERING_COUNTER) related to the power ramping, and the counter is configured for power ramping calculation. The previous power ramping formula of the LTE is reused, and standard changes are relatively small, but a counter description needs to be added to the protocol.

In some embodiments, because the counter (POWER_POWERING_COUNTER) related to the power ramping is a variable related to a change of the uplink beam, the power ramping formula may further be as follows:

$$\text{preambleInitialReceivedTargetPower}+\text{DELTA\_PREAMBLE}+(\text{POWER\_POWERING\_COUNTER}+\text{sgn}(x)-1)*\text{powerRampingStep} \quad (2)$$

x may be a value of 0 or 1, where 0 represents that the beam that sends the Msg 1 is the same as the beam previously used to send the Msg 1, and 1 represents that the beam that sends the Msg 1 is different from the beam previously used to send the Msg 1.

Determining Whether a Msg1 Sending Beam Changes

Whether the Msg1 sending beam changes depends on the terminal device for implementation. The terminal device determines that the Msg 1 beam changes, possibly due to that a MAC entity receives a physical layer PHY indication or a beam change indication of an upper layer, so that the terminal device calculates the preamble target received power based on the power ramping formula on the MAC layer, and indicates to the physical layer, the calculated preamble target received power, a physical random access channel (PRACH) selected for sending the Msg 1, a related radio network temporary identifier (RA-RNTI), a preamble index, and/or an uplink beam selected for sending the Msg 1.

Case 2: One counter is maintained, and sending of the plurality of Msgs 1 in the RAR window is not considered.

(1) Parameter Maintenance

The parameter maintenance is the same as that in the case 1. Details are not described herein again.

(2) Power Ramping Formula

In some embodiments, the terminal device maintains a preamble transmission counter PREAMBLE_TRANSMISSION_COUNTER. The counter may not only be configured for the terminal device to calculate the power, but also be configured to determine whether a limit on a maximum times of preamble transmission is exceeded, and if the maximum times of preamble transmission is exceeded, a MAC entity needs to indicate to an upper layer that the problem of random access occurs. In the case in which one counter is used in the random access process, standard changes are relatively small, but a corresponding description needs to be added to the protocol. In this case, the power ramping formula is as follows:

$$\text{preambleInitialReceivedTargetPower}+\text{DELTA\_PREAMBLE}+(\text{PREAMBLE\_TRANSMISSION\_COUNTER}-1)*\text{powerRampingStep} \quad (3)$$

The corresponding description in the standard is as follows: When the beam that sends the Msg 1 is the same as the beam previously used to send the Msg 1, a value of a parameter POWER_POWERING_COUNTER related to the power ramping used for the power ramping is increased by 1, and the power is increased based on the power ramping step corresponding to the beam. When the retransmission beam changes, the value of the parameter POWER_TRANSMISSION_COUNTER related to the power ramping used for the power ramping remains unchanged, and the power is increased based on the power ramping step corresponding to the retransmission beam. However, a description on a quantity of times of preamble transmission is as follows: The first time the preamble is sent, a quantity of times of Msg 1 preamble transmission is increased by 1, and each time the preamble is sent subsequently, regardless of whether the beam that sends the Msg 1 is the same as the previous beam, the quantity of times of preamble transmission is always increased by 1 based on a previous quantity of times of preamble transmission. In this way, in the standard, a variable count of the times of preamble transmission is not reflected, and is described by text instead. When the quantity of times of preamble transmission exceeds a limit on a maximum times of preamble transmission, the MAC entity indicates to the upper layer that a problem of random access occurs.

(3) Determining Whether the Msg1 Sending Beam Changes

A case of determining whether the Msg1 sending beam changes is the same as a corresponding part in the case 1. Details are not described herein again.

Case 3: Two counters are separately maintained, and a case in which the plurality of Msgs 1 are sent in the RAR window is considered.

In some embodiments, if the terminal device is allowed to send a plurality of Msgs 1 on a plurality of beams before receiving a RAR message that belongs to the terminal device, the plurality of the Msgs 1 are sent in a plurality of sending forms, and the sending beams may be the same, or may be different. Specifically, the following several cases may be included:

on a same beam, a same preamble is sent by using different time-frequency resources, or on a same beam, different preambles are sent by using a same time-frequency resource, or on different beams, at a same moment, a same preamble is sent by using different frequency domain resources, or on different beams, at a same moment, different preambles are sent by using a same frequency domain resource.

No matter which form is used for the sending of the plurality of Msgs 1, and no matter whether the beam changes, the value of the parameter PREAMBLE_TRANSMISSION_COUNTER related to the power ramping remains unchanged. Correspondingly, before the terminal device receives the RAR message that belongs to the terminal device, powers at which the plurality of Msgs 1 are sent may be completely the same, or the value of the parameter PREAMBLE_TRANSMISSION_COUNTER related to the power ramping remains unchanged, but the transmit power is set based on the power ramping step corresponding to the sending beam.

Correspondingly, different methods for power ramping correspond to different power ramping formulas.

Method 1: The power ramping formula in the LTE is reused, but a correction value is added to a plurality of Msg 1 transmissions in the RAR window, to ensure that the powers of the plurality of Msg 1 transmissions in one RAR window are the same.

Method 2: Msgs 1 are sent for a plurality of times in one RAR window, and regardless of whether the beam that sends the Msgs 1 changes, the value of the power ramping counter value remains unchanged; correspondingly, the formula of LTE is reused, but a standard description needs to be added.

Method 3: Msgs 1 are sent for a plurality of times in one RAR window. Each time the Msg 1 is sent, whether the sending beam changes affects the value of the power ramping counter. When the beam changes, the counter value remains unchanged; and when the beam remains unchanged, the counter value is increased by 1. Then the PHY is informed of the calculated power, and after the PHY calculates the transmit power through path loss and the like, the transmit power is compared with a maximum transmit power, so that an actual transmit power is obtained. When the actual transmit power reaches a maximum value, regardless of whether the Msg 1 beam changes, the maximum transmit power remains unchanged.

In the method 1, the LTE power ramping formula is reused and a power correction value is added to a plurality of Msg 1 transmissions.

(1) Parameter Maintenance

In some embodiments, the terminal device separately maintains a power ramping counter POWER_POWERING_COUNTER and a preamble transmission counter PREAMBLE_TRANSMISSION_COUNTER. Functions of the two counters are different, and the power ramping counter is configured for the terminal device to calculate the power, and the preamble transmission counter is configured to determine whether a limit on a maximum times of preamble transmission is exceeded, and if the maximum times of preamble transmission is exceeded, a MAC entity needs to indicate to an upper layer that the problem of random access occurs.

When the random access process is initialized, the two counters are set to 0, and then based on whether an UL beam that sends the Msg 1 changes, an increase of the counter value is maintained. After the random access process ends (the random access is a success or the random access is a failure because a maximum times of preamble transmission is reached), the values of the foregoing two counters are reset to 0.

In addition, a variable of a quantity of times of Msg 1 transmission in one RAR window is maintained, and the sending of Msgs 1 by UE in one RAR window is defined as one transmission attempt opportunity. This variable is equivalent to a quantity of times of transmission that can be performed by the UE in the RAR window after the UE obtains a transmission attempt opportunity, and the variable may be denoted as numPreambleAttemptperRARwindow.

(2) Power Ramping Formula

In this method, the preamble target received power PREAMBLE_RECEIVED_TARGET_POWER may be calculated based on the power ramping formula, and the power ramping formula may be as follows:

preambleInitialReceivedTargetPower+DELTA_PREAMBLE+(POWER_POWERING_COUNTER−1)*powerRampingStep  (4)

In a case in which a plurality of Msgs 1 are allowed to be sent in one RAR window, the PREAMBLE_RECEIVED_TARGET_POWER values are further corrected. In this case, the preamble target received power PREAMBLE_RECEIVED_TARGET_POWER may be:

PREAMBLE_RECEIVED_TARGET_POWER−f(numPreambleAttemptperRARwindow)

$f(\cdot)$ herein represents a function, and in some embodiments, the function may be in a form of logarithmic function, and an example is as follows:

PREAMBLE_RECEIVED_TARGET_POWER−10*log 10(numPreambleAttemptperRARwindow)  (5)

As shown in the formula (5), the transmit power of the Msg 1 may be determined based on different parameters related to the power ramping and a variable of a quantity of times of Msg 1 transmission, so that the terminal device is enabled to learn of the transmit power of the current Msg 1, and the terminal device performs random access again based on the transmit power of the Msg 1. A description on the power ramping counter values PREAMBLE_RECEIVED_TARGET_POWER in the foregoing formula is the same as that in the case 1. Details are not described again.

In the method 2, Msgs 1 are sent for a plurality of times in one RAR window, and regardless of whether the beam that sends the Msgs 1 changes, the value of the power ramping counter remains unchanged; correspondingly, the formula of LTE is reused, but a standard description needs to be added.

In this method, the preamble target received power PREAMBLE_RECEIVED_TARGET_POWER may be calculated based on the power ramping formula, and the power ramping formula may be as follows:

preambleInitialReceivedTargetPower+DELTA_PREAMBLE+(POWER_POWERING_COUNTER−1)*powerRampingStep  (6)

In a same random access attempt opportunity, that is, in a same RAR window, Msgs 1 are sent for a plurality of times (numPreambleAttemptperRARwindow). Regardless of whether the Msg 1 beam changes, the value of the counter for power ramping remains unchanged. However, only when the power ramping counter re-obtains, after the Msgs 1 are sent for a plurality of times in a same RAR window, the random access attempt opportunity, there are the following choices for the change of the value of the power ramping counter.

1: When the random access attempt opportunity is re-obtained, the value of power ramping counter is increased by 1.

2: When the random access attempt opportunity is re-obtained, the change of the beam that sends the first Msg 1 is used as a basis for the change of the power ramping counter. To be specific, when the beam that sends the first Msg 1 is the same as the beam that sends the first Msg 1 in the previous random access attempt opportunity, the value of the parameter POWER_POWERING_COUNTER related to the power ramping used for the power ramping is increased by 1, and the power is increased based on the power ramping step corresponding to the beam. When the beam that sends the first Msg 1 is different from the beam that sends the first Msg 1 in the previous random access attempt opportunity, the value of the parameter POWER_POWERING_COUNTER related to the power ramping used for the power ramping remains unchanged, and the power is increased based on the power ramping step corresponding to the retransmission beam.

3: When the random access attempt opportunity is re-obtained, whether a sending pattern pattern of the Msg 1 (a sending form of a plurality of Msgs 1) changes is used as a basis for the change of the power ramping counter. To be specific, when the Msg 1 sending pattern is the same as a Msg 1 sending pattern in the previous random access attempt opportunity, the counter value remains unchanged, and when two adjacent Msg 1 sending patterns are different, the counter value is increased by 1. Herein, the Msg 1 sending pattern may be understood as related configurations such as a quantity of times of Msg 1 transmission in one random access attempt opportunity, and time domain, frequency domain, and a beam that are used each time the Msg 1 is sent.

In the method 3, Msgs 1 are sent for a plurality of times in one RAR window. Each time the Msg 1 is sent, whether the sending beam changes affects the value of the power ramping counter. When the beam changes, the counter remains unchanged; and when the beam remains unchanged, the counter value is increased by 1. Then the PHY is informed of the calculated power, and after the PHY calculates the transmit power through path loss and the like, the transmit power is compared with a maximum transmit power, so that an actual transmit power is obtained. When the actual transmit power reaches a maximum value, regardless of whether the Msg 1 beam changes, the maximum transmit power remains unchanged. In this case, $$\text{preambleInitialReceivedTargetPower+DELTA\_PREAMBLE+(POWER\_POWERING\_COUNTER-1)*powerRampingStep} \quad (7)$$

In the foregoing formula, even if Msgs 1 are sent for a plurality of times, each time the Msg 1 is sent, determining is performed based on whether the sending beam is the same as a beam that previously sends the Msg 1. When the beam that sends the Msg 1 is the same as the beam previously used to send the Msg 1, the value of the parameter POWER_POWERING_COUNTER related to the power ramping used for the power ramping is increased by 1, and the power is increased based on the power ramping step corresponding to the beam. When the retransmission beam changes, the value of the parameter POWER_POWERING_COUNTER related to the power ramping used for the power ramping remains unchanged, and the power is increased based on the power ramping step corresponding to the retransmission beam.

Whether the Msg1 sending beam changes depends on the terminal device for implementation. The terminal device determines that the Msg 1 beam changes, possibly due to that a MAC entity receives a physical layer PHY indication or a beam change indication of an upper layer, so that the terminal device calculates the preamble target received power PREAMBLE_RECEIVED_TARGET_POWER based on the power ramping formula on the MAC layer, and indicates to the physical layer, the calculated PREAMBLE_RECEIVED_TARGET_POWER, a PRACH selected for sending the Msg 1, a related RA-RNTI, a preamble index, and/or an UL beam selected for sending the Msg 1. After receiving the PREAMBLE_RECEIVED_TARGET_POWER in combination with considering a pathloss, and the like, the physical layer calculates a transmit power based on a calculation method of the physical layer, and compares the transmit power with the Msg 1 maximum transmit power, and when the transmit power reaches the maximum preamble transmit power, the maximum transmit power remains unchanged.

Case 4: One counter is maintained, and sending of a plurality of Msgs 1 in the RAR window is considered.

The UE maintains one counter, that is, the preamble transmission counter. In addition, the UE further maintains a parameter, used to indicate a quantity numPreambleAttemptperRARwindow of Msgs 1 that can be sent in one random access attempt opportunity (in a same RAR window). In the same RAR window, regardless of whether the beam that sends the Msg 1 changes, transmit powers of the plurality of Msgs 1 remain unchanged, and a corresponding power ramping formula is as follows:

$$\text{preambleInitialReceivedTargetPower+DELTA\_PREAMBLE+(floor (PREAMBLE\_TRANSMISSION\_COUNTER/numPreambleAttemptperRARwindow)-1)*powerRampingStep} \quad (8)$$

In the same RAR window (in one random access attempt opportunity), each time the Msg 1 is sent, a quantity PREAMBLE_TRANSMISSION_COUNTER of times of preamble transmission is increased by 1. Correspondingly, after another random access attempt opportunity is entered, a change of the value of the power ramping counter depends on whether the beam that sends the Msg 1 changes. Possible selection cases are as follows.

1: When the random access attempt opportunity is re-obtained, the change of the beam that sends the first Msg 1 is used as a basis for the change of the power ramping counter. To be specific, when the beam that sends the first Msg 1 is the same as the beam that sends the first Msg 1 in the previous random access attempt opportunity, the value of the parameter PREAMBLE_TRANSMISSION_ COUNTER related to the power ramping used for the power ramping is increased by 1, and the power is increased based on the power ramping step corresponding to the beam. When the beam that sends the first Msg 1 is different from the beam that sends the first Msg 1 in the previous random access attempt opportunity, the value of the parameter PREAMBLE_TRANSMISSION_COUNTER related to the power ramping used for the power ramping is set to PREAMBLE_TRANSMISSION_COUNTER-numPreambleAttemptperRARwindow, and the power is increased based on the power ramping step corresponding to the retransmission beam.

2: When the random access attempt opportunity is re-obtained, whether a sending pattern pattern of the Msg 1 (a sending form of a plurality of Msgs 1) changes is used as a basis for the change of the power ramping counter. To be specific, when the Msg 1 sending pattern is the same as a Msg 1 sending pattern in the previous random access attempt opportunity, the counter value is set to PREAMBLE_TRANSMISSION_COUNTER-numPreambleAttemptperRARwindow, and when two adjacent Msg 1 sending patterns are different, the value of PREAMBLE_TRANSMISSION_COUNTER is increased by 1. Herein, the Msg 1 sending pattern may be understood as related configurations such as a quantity of times of Msg 1 transmission in one random access attempt opportunity, and time domain, frequency domain, and a beam that are used each time the Msg 1 is sent.

5. Other Content Related to the Random Access Process

The random access discussed in the 5G may be used to request an on-demand system information (on-demand SI), and the request for the on-demand SI may be sent by the Msg 1/Msg 3.

(1) The Msg 1 sends an on-demand system information request (on-demand SI request).

Figure 3:
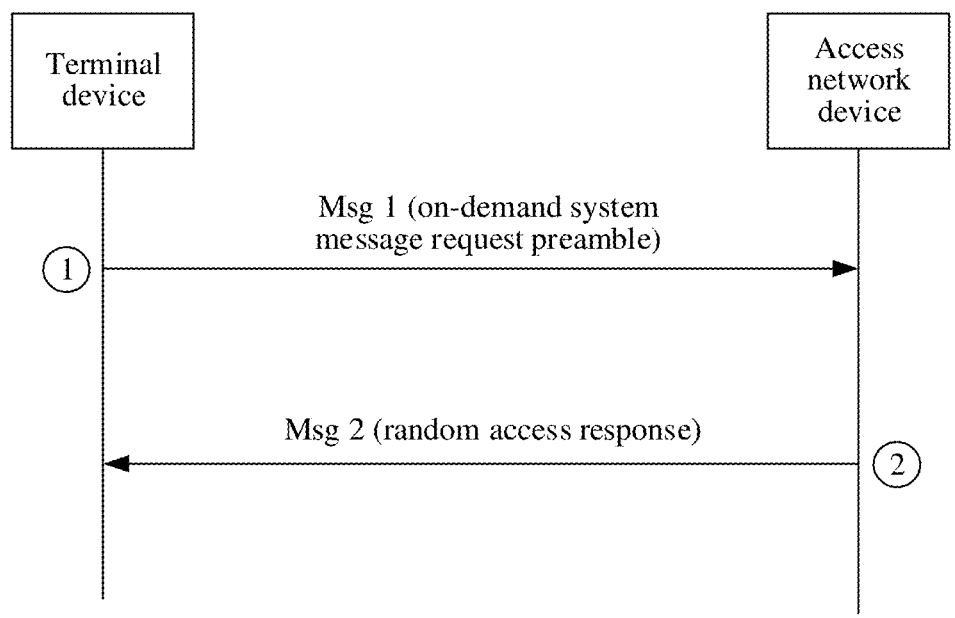
FIG. 3 is a schematic diagram of sending an on-demand system information request based on a Msg 1 according to an embodiment of this disclosure.

In this case, a random access preamble may be configured to request to send a plurality of pieces of on-demand SI. When receiving the preamble, the access network device may learn of, based on a correspondence between the preamble and the on-demand SI, a system information requested by the terminal device. The terminal device and the access network device only need to exchange the on-demand SI request and an on-demand SI acknowledgement. Therefore, a case in which the on-demand SI request is sent based on the Msg 1 includes only randomly accessed Msg 1 and Msg 2, as shown in FIG. 3.

Figure 4:
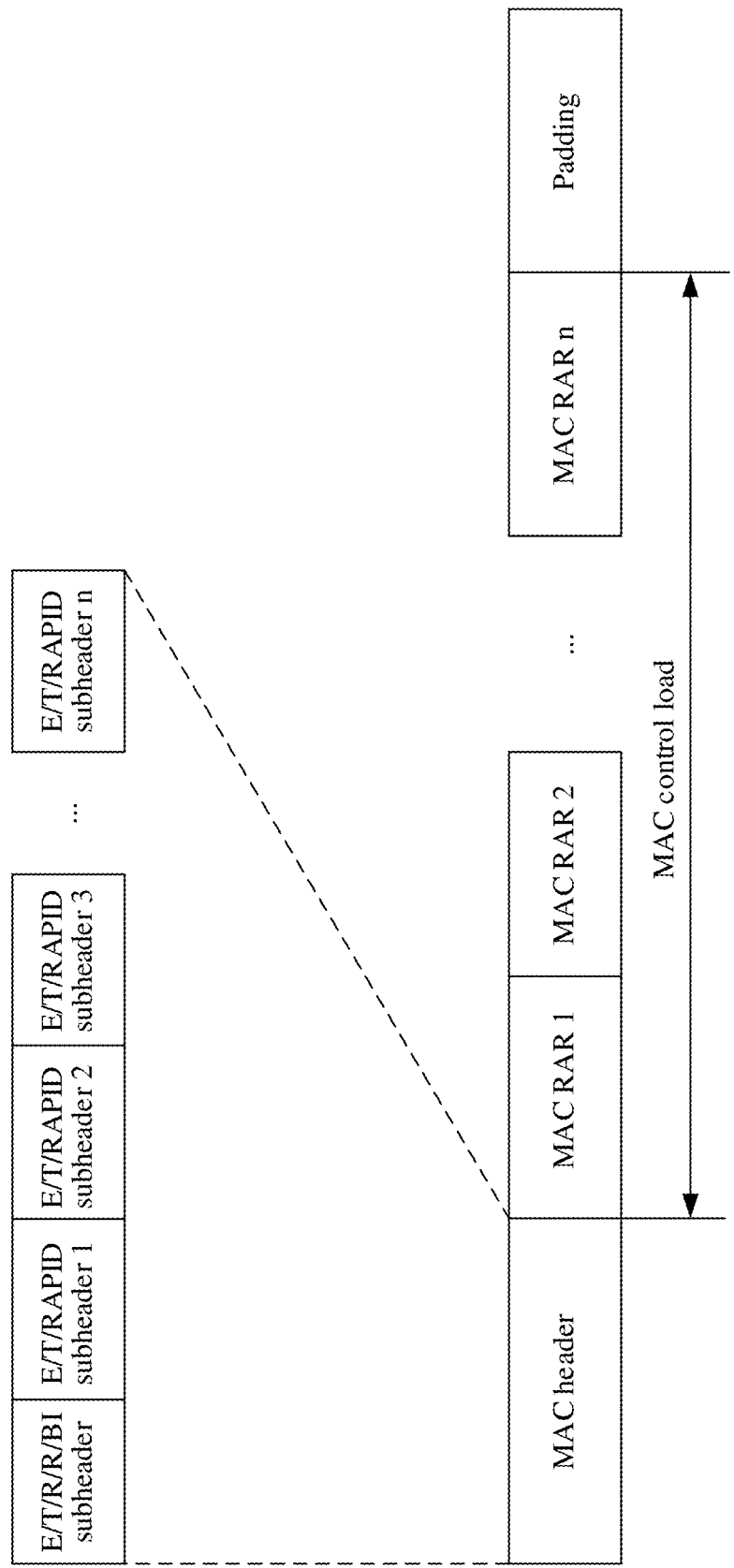
FIG. 4 is a schematic structural diagram of a media access control protocol data unit MAC PDU according to an embodiment of this disclosure.
Figure 5:
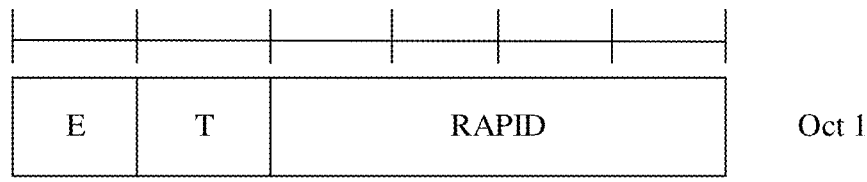
FIG. 5 is a schematic diagram 1 of a media access control MAC subheader according to an embodiment of this disclosure.
Figure 6:
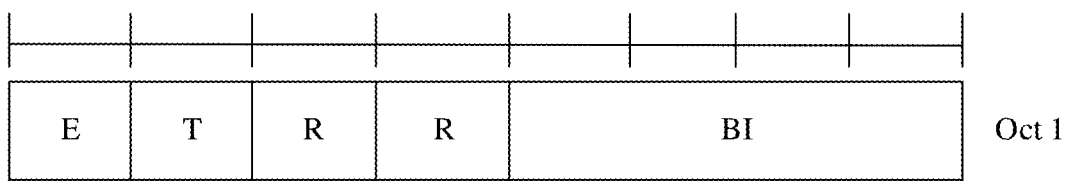
FIG. 6 is a schematic diagram 2 of a media access control MAC subheader according to an embodiment of this disclosure.
Figure 7:
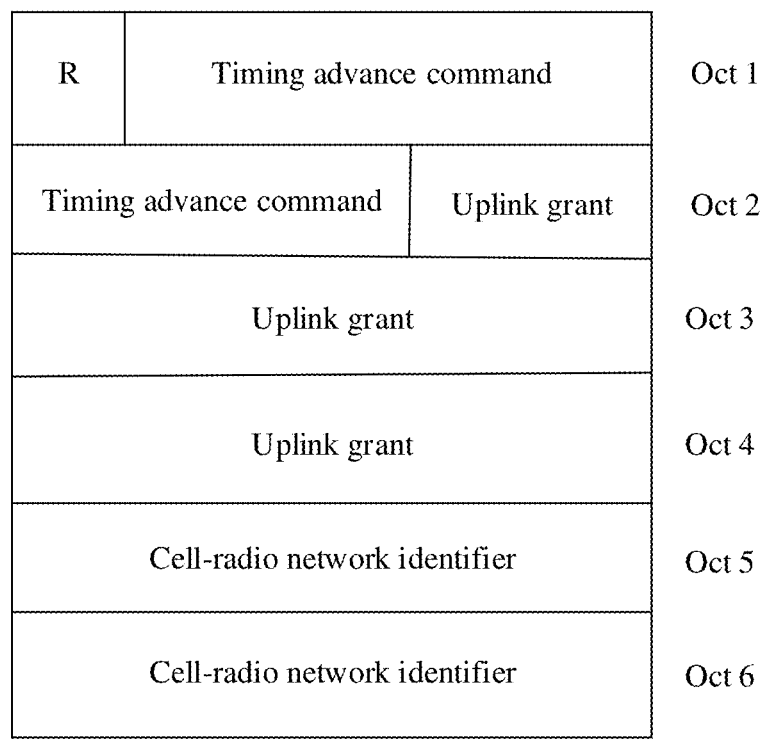
FIG. 7 is a schematic diagram of a media access control random access response MAC RAR according to an embodiment of this disclosure.

FIG. 4 is a schematic structural diagram of an LTE media access control protocol data unit (MAC PDU). As shown in FIG. 4, one MAC PDU includes a MAC header and one or more MAC RARs. The MAC header includes two types of MAC sub-headers (MAC sub-header), namely, an E/T/RAPID MAC sub-header and an E/T/R/R/BI MAC sub-header, and schematic diagrams of the two MAC subheaders are respectively shown in FIG. 5 and FIG. 6. In addition, each E/T/RAPID MAC subheader corresponds to one RAR, and a structure of the RAR is shown in FIG. 7. The RAR carries timing advance TA, uplink resource grant (UL grant), a cell-radio network temporary identifier (temporary C-RNTI) and the like that are used to send the Msg 3.

If the on-demand SI is sent based on the Msg 1, only the Msg 1 and the Msg 2 need to be sent, and the subsequent Msg 3 and Msg 4 may not be sent. Therefore, the RAR may not need indication information such as TA, UL grant, and TC-RNTI, that is, there is no RAR part.

Therefore, in this case, when a random access response protocol data unit (RAR PDU) replies, a reply to the preamble corresponding to the on-demand SI request is different from that in the conventional LTE. In this case, a MAC RAR may not have a one-to-one correspondence with a MAC RAR sub-header. The MAC PDU may include only a MAC RAR sub-header and does not include a corresponding MAC RAR. The MAC RAR sub-header herein includes a preamble identifier, and when the terminal device detects that a preamble indication included in a MAC sub-header is the same as the preamble used when the terminal device sends the on-demand SI request, the terminal device considers that the on-demand SI request is successfully sent. In this case, the MAC sub-header is equivalent to an acknowledgment of the on-demand SI request, and in the following, the on-demand SI sent by the access network device is received based on a system message-radio network temporary identifier (SI-RNTI).

In some embodiments, for different on-demand SI receiving, different SI-RNTIs may be distinguished.

In some embodiments, to increase a probability that an on-demand SI request is successfully sent, the terminal device may send a plurality of Msgs 1 before receiving a reply that belongs to the terminal device (that is, the RAR sub-header). The sending of the plurality of Msgs 1 is the same as that in the foregoing description. Details are not described herein again.

After receiving the RAR sub-header that belongs to the terminal device, the terminal device may know that the on-demand SI request is already successfully sent, and the terminal device subsequently receives the on-demand SI sent by the access network device. The RAR sub-header includes a preamble identifier, but the specific format depends on a preamble design in the 5G, and no limitation is made herein.

(2) The Msg 3 sends the on-demand SI request.

Figure 8:
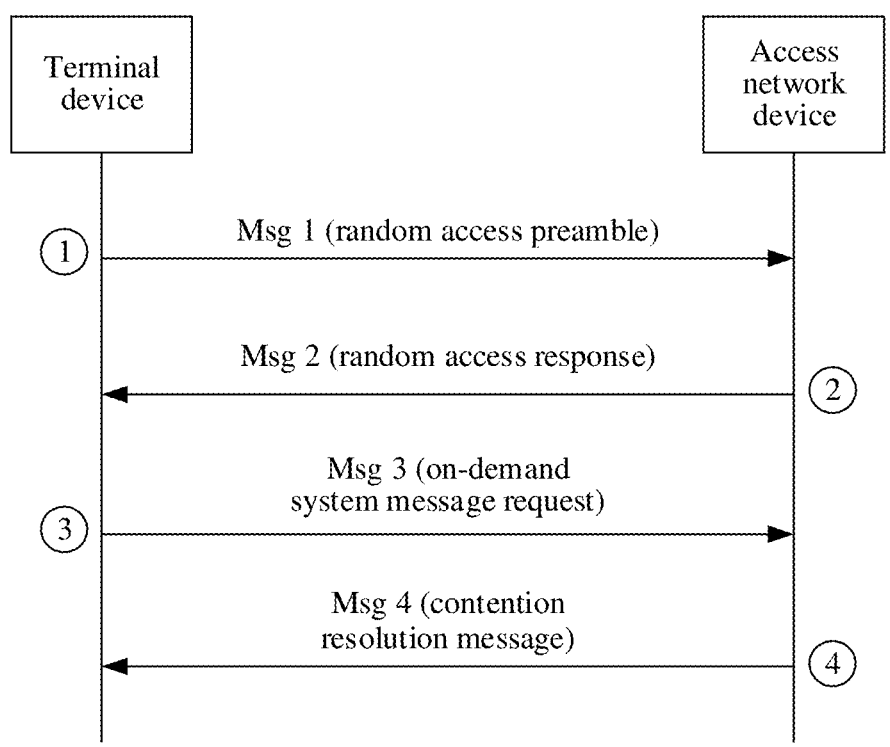
FIG. 8 is a schematic diagram of sending an on-demand system information request based on a Msg 3 according to an embodiment of this disclosure.

FIG. 8 is a schematic diagram of sending an on-demand SI request based on a Msg 3. In this case, the following operations are performed.

Operation 1. The terminal device sends an on-demand SI request by using the Msg 3, and the Msg 3 may carry identifier information of the terminal device and an indication list of a requested system information block (SIB), where the Msg 3 may carry the identifier information of the terminal device, and the identifier information of the terminal device needs to distinguish whether the terminal device is in different modes, for example, (1) for a terminal device in an idle mode (idle mode UE), the identifier information of the terminal device may be a cell-radio network temporary identifier (C-RNTI);

(2) for a terminal device in an inactive mode (inactive mode UE), the identifier information of the terminal device may be a resume-like ID; or (3) for a terminal device in a connected mode (connected mode UE), the identifier information of the terminal device may be a C-RNTI.

The Msg 3 may carry the indication list of the requested SIB. The SIB indication manner may be in a bitmap form or to display the use of system information block index(s) (SIB index(s)) for indication.

The bitmap form herein may be understood as a fixed binary bit, each bit corresponds to one SIB, and 0 or 1 is used to indicate whether the terminal device requests the corresponding SIB. For example, three binary bits are used to respectively indicate SIB 1, SIB 2 and SIB 3. 001 represents that the terminal device requests the SIB 3, 101 represents that the terminal device requests the SIB 1 and the SIB 3, and so on. Details are not described again.

Operation 2. After completing the sending of the Msg 3, the terminal device listens to whether the Msg 4 has acknowledgement indication information that the SI-request sent in the Msg 3 is successfully received by the access network device, and the RNTI used by the UE to listen to the Msg 4 may be any one of the following:

(1) for the IDLE mode UE, the C-RNTI in the Msg 2 may be used for indication;

(2) for the inactive mode UE, the C-RNTI stored in the UE access stratum context (AS context) may be used for indication; or (3) for the connected mode UE, the C-RNTI may be used for indication.

In some embodiments, for a terminal device in the idle mode, after sending a system request message in the Msg 3, the terminal device uses the C-RNTI and SI-RNTI in the Msg 2 for listening, and stops listening until the requested system message is successfully received.

In some embodiments, the Msg 4 may alternatively be used to send SIB(s) sent in the Msg 3, and the access network device may send the requested SIB(s) through radio resource control (RRC) signaling.

In some embodiments, as described above, in different random access scenarios, content in the Msg 3 may be different. The Msg 3 may introduce a new MAC CE message to instruct the sending of the on-demand SI. When the access network device successfully receives the Msg 3, or the access network device learns of the on-demand SI required by the terminal device, correspondingly, when the access network device sends a downlink message to the terminal device, the downlink message may introduce a new MAC CE to indicate the on-demand SI required by the terminal device. In this case, when the terminal device receives the on-demand SI, the terminal device considers a contention resolution corresponding to the Msg 4 a success. A difference between this case and that in the LTE technology lies in that the LTE considers a contention resolution a success only after the contention resolution that belongs to a MAC entity is received.

Operation 3. When the terminal device does not successfully receive the SI, the terminal device re-sends the Msg 1 or the Msg 3, so that the terminal device re-obtains the system message SI, that is, re-sends the on-demand SI request until a maximum times is reached.

In some embodiments, a maximum times corresponding to the on-demand SI request may be a maximum times of preamble transmission, or may be a maximum times of Msg 3 transmission, such as a number of times of a hybrid automatic repeat request (HARQ) corresponding to the Msg 3.

In addition, a limit on a maximum times of retransmission corresponding to the on-demand SI may be the same as, or may be different from a limit on a maximum times of retransmission corresponding to another random access scenario.

Operation 4. The on-demand SI is sent based on the Msg 1/Msg 3, and when the SI still cannot be successfully received after a maximum times of random access is reached, UE in different states may perform different operations.

(1) the IDLE mode UE may enter the connected mode to receive the on-demand SI, or select another suitable cell to perform a cell selection; or (2) after a limit on a maximum times is reached, the connected mode UE performs a cell selection and requests the SI from another suitable cell.

In some embodiments, when performing the random access, the terminal device may learn of the current serving beam of the terminal device in advance.

In some embodiments, after the terminal device enters the connected mode through the random access process, the terminal device may also learn of the current serving beam of the terminal device.

In some embodiments, the terminal device may determine, based on identifier information of the current serving beam, the current serving beam of the terminal device.

220. The terminal device measures the current serving beam, to obtain a first measured value.

In some embodiments, the terminal device may obtain the first measured value in a layer 2 combination or layer 2 filtering manner.

It should be understood that, because the terminal device measures the current serving beam, to obtain the first measured value, the first measured value is a measured value of the current serving beam.

230. Compare the first measured value with a measurement threshold, to determine whether another beam needs to be measured.

In some embodiments, the terminal device compares the first measured value with the measurement threshold, and when the first measured value is less than the preset measurement threshold, the terminal device determines that a reference signal of some or all of another one or more beams other than the current serving beam needs to be measured.

In some embodiments, if the first measured value is greater than the measurement threshold, it indicates that the signal quality of the current serving beam is relatively good, the current serving beam on which the terminal device is located does not need to be switched, and the process ends.

240. If the first measured value is less than or equal to the measurement threshold, the terminal device measures the another beam, to obtain a second measured value.

In some embodiments, the terminal device may obtain the second measured value in a layer 2 combination or layer 2 filtering manner.

In some embodiments, the second measured value is a measured value obtained by measuring a reference signal of some or all of another one or more beams by the terminal device, so that the second measured value may be one value or may be a plurality of values.

250. The terminal device sends a measurement report to the access network device.

In some embodiments, the measurement report is configured by the terminal device based on the measurement report configuration information. How the terminal device configures the measurement report based on the measurement report configuration information is described in detail in operation 210, and for brevity, details are not described herein again.

260. The access network device sends a third message to the terminal device based on the measurement report configuration information included in the received measurement report and/or a switching mechanism preset by the access network device.

In some embodiments, the third message includes switching indication information, and the switching indication information is used to instruct the terminal device to switch the serving beam.

In some embodiments, the third message may be a physical downlink control channel PDCCH message, or a media access control control element MAC CE message.

In this embodiment of this disclosure, by introducing different measurement types, measurement of different granularities may be implemented, so that the measurement granularity is more refined and measurement results are more accurate.

Figure 9:
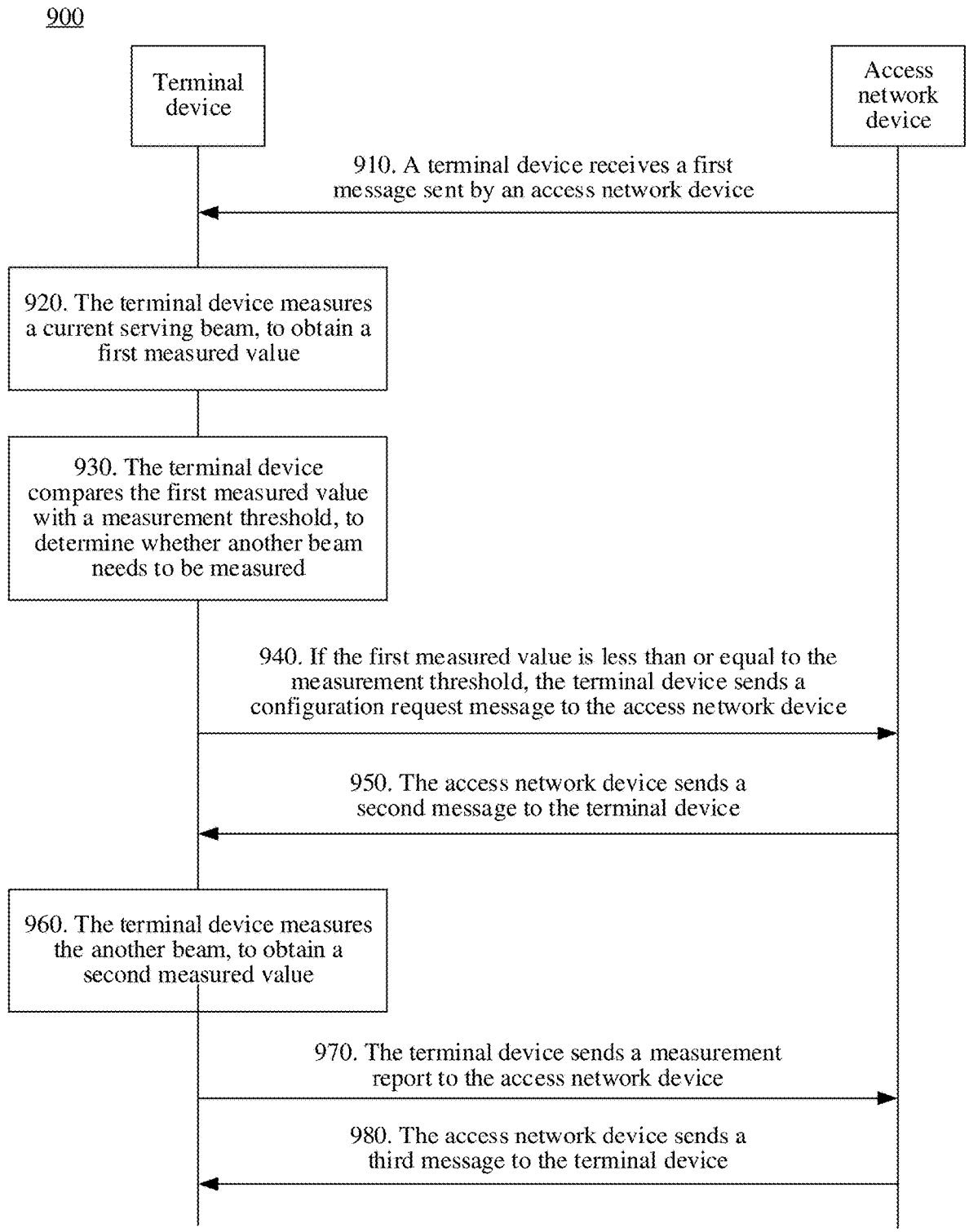
FIG. 9 is still another schematic flowchart of a measurement method according to an embodiment of this disclosure.

FIG. 9 is a schematic flowchart of a measurement method 900 according to an embodiment of this disclosure. The method 900 is described by using an example in which a measurement granularity is a beam measurement granularity, but the method is not limited thereto. As shown in FIG. 9, the method 900 includes the following operations.

910. A terminal device receives a first message sent by an access network device.

The first message includes measurement type information, the measurement type information is used to indicate a first measurement granularity, and the first measurement granularity is a beam measurement granularity.

It should be understood that, when the first measurement granularity is a beam measurement granularity, the beam may be one beam, or a beam group formed by a plurality of beams or a TRP. Therefore, when the first measurement granularity is a beam measurement granularity, the measurement granularity in this case may actually be any one of a beam measurement granularity, a beam group measurement granularity and a TRP measurement granularity.

In some embodiments, the first message includes only measurement type information and information related to a current serving beam.

In some embodiments, the first message may be carried by a connection reconfiguration message of radio resource control (RRC), and sent by the access network device to the terminal device, or may be carried by another RRC signaling and sent by the access network device to the terminal device. This is not limited in this embodiment of this disclosure.

In some embodiments, the first message may be a physical downlink control channel (PDCCH) message, or a medium access control control element (MAC CE) message.

In some embodiments, the first message may further include a measurement threshold corresponding to the first measurement granularity. The measurement threshold has a same function as the measurement threshold in the prior art, and is used to be compared with a measured value of a current serving cell in which the terminal device is located or a measured value of a current serving beam, to determine whether another cell or another beam needs to be measured.

However, in this embodiment of this disclosure, for different measurement granularities, the measurement threshold may be different. For example, when the first measurement granularity is a cell measurement granularity, the measurement threshold corresponds to a cell measurement threshold, and when the first measurement granularity is a beam measurement granularity, the measurement threshold corresponds to a beam measurement threshold. The cell measurement threshold and the beam measurement threshold may be different, and certainly a case in which the two values are the same may exist. This is not limited in this embodiment of this disclosure.

In some embodiments, the measurement threshold is a measurement threshold of the current serving cell or the current serving beam, and a measurement threshold may not be set for another cell or another beam.

In some embodiments, the first message may alternatively include a beam identifier of the current serving beam.

In some embodiments, the first message may further include a measurement object, and when the first measurement granularity is a beam measurement granularity, the measurement object is the current serving beam.

In other words, the measurement object included in the first message is a reference signal of the current serving beam.

In some embodiments, the reference signal may be referred to as a beam reference signal (BRS), and the BRS may be a channel state information-reference signal (CSI-RS), may be a demodulation reference signal (DM-RS), or may be a synchronization signal block (SS block), or another reference signal. This embodiment of this disclosure is not limited thereto.

In some embodiments, the terminal device measures a reference signal of the current serving beam, to obtain a first measured value.

In some embodiments, when the first measurement granularity is a cell measurement granularity, the measurement object is a cell-specific reference signal, including a reference signal of the current serving cell, and a reference signal of another cell other than the current serving cell.

In some embodiments, the first message may further include at least one of measurement report configuration information, a measurement identifier, and measurement quantity configuration information.

It should be understood that, the measurement report configuration information, the measurement identifier, and the measurement quantity configuration information are all information related to the current serving beam, and the information does not include information related to another one or more beams other than the current serving beam.

In some embodiments, when the first measurement granularity is a beam measurement granularity, the measurement report configuration information is used to instruct the terminal device to send a measured value of each of N beams and/or a combined value of measured values of the N beams in the measurement report.

In some embodiments, a quantity of N is configured by the access network device, and N is a positive integer greater than or equal to 1.

It should be understood that, the combined value of measured values of the N beams is a value obtained by the terminal device in a first preset manner. The first preset manner may be a plurality of manners in the prior art. For example, the first preset manner may be performing weighted summation on the N measured values, to obtain the combined value, or the first preset manner may be averaging the N measured values, to obtain the combined value.

It should be further understood that, the measured values of the N beams may include the first measured value and the second measured value, that is, may be the measured value of the current serving beam, or may be the measured value of another beam other than the current serving beam.

In some embodiments, the terminal device may obtain the measured value in a plurality of manners. For example, the terminal device may use a layer 2 combination and/or layer 2 filtering manner. For example, the layer 2 may be a media access control (MAC) layer, a radio link control (RLC) layer, or a packet data convergence protocol (PDCP) layer, to obtain a measured value of a BRS of the current serving beam and a measured value of a BRS of another beam other than the current serving beam.

It should be understood that, the measured values of the N beams included in the measurement report may be a result selected by the terminal device. For example, the terminal device selects measured values of first N beams that have largest measured values in all beams. Alternatively, the measured values of the N beams included in the measurement report may be a result selected by the terminal device based on a first preset condition preconfigured by the access network device. For example, the first preset condition may be that a measured value of each of the N beams is greater than or equal to a first threshold, and the first threshold may be configured by the access network device.

In some embodiments, when a quantity of corresponding beams whose measured values are greater than or equal to a first threshold is greater than N, the measured values of first N beams in the corresponding beams whose measured values are greater than or equal to the first threshold may be selected as content of the measurement report.

It should be understood that, when the first measurement granularity is a beam measurement granularity, the terminal device may report, when reporting a measurement result to the access network device, a measured value of each of the selected N beams to the access network device, so that the access network device determines, based on the measured value, whether to switch the current serving beam. In other words, the measurement report configuration information instructs the terminal device to send the measured value of each of the N beams in the measurement report. The terminal device may alternatively combine the measured values of the N beams into a combined value, and then report the combined value to the access network device. In other words, the measurement report configuration information instructs the terminal device to send the combined value of the measured values of the N beams in the measurement report. The method in which the terminal device combines the measured values of the N beams to obtain the combined value may be any one of a plurality of methods in the prior art. For example, the method may be performing weighted summation on the N measured values or averaging the N measured values. This is not limited in this embodiment of this disclosure. The terminal device may further simultaneously report the measured values of the N beams and the combined value of the measured values of the N beams to the access network device. In other words, the measurement report configuration information may further instruct the terminal device to send the measured value of each of the N beams and the combined value of the measured values of the N beams in the measurement report.

In some embodiments, when the first measurement granularity is a beam measurement granularity and the beam is actually a beam group including a plurality of beams, the measurement report configuration information may instruct the terminal device to send, in the measurement report, measured values of M beams and a measured value of each beam in the beam group in which the M beams are located.

In some embodiments, when the measurement granularity is actually a beam group measurement granularity, the measurement report configuration information may further instruct the terminal device to send, in the measurement report, the measured values of the M beams and a combined value of measured values of all beams in the beam group in which the M beams are located.

In some embodiments, a quantity of M is configured by the access network device, and M is a positive integer greater than or equal to 1.

In some embodiments, the combined value of the measured values of all the beams in the beam group in which the M beams are located may be obtained by calculation in a second preset manner.

In some embodiments, the second preset manner may be a plurality of manners in the prior art. For example, the second preset manner may be performing weighted summation on the M measured values, to obtain the combined value, or the second preset manner may be averaging the M measured values, to obtain the combined value.

For example, a quantity of M configured by the access network device to the terminal device is three, and two of the three beams are from a first beam group, and the other beam is from a second beam group. In this case, the measurement report reported by the terminal device to the access network device includes measured values of the three beams and a measured value of each beam in the first beam group and the second beam group in which the three beams are located. Alternatively, the measurement report reported by the terminal device to the access network device includes measured values of the three beams, a combined value of measured values of all beams in the first beam group in which the three beams are located, and a combined value of measured values of all beams in the second beam group in which the three beams are located.

In some embodiments, when the measurement granularity is actually a beam group measurement granularity, the measurement report configuration information may further instruct the terminal device to send, in the measurement report, the measured values of the M beams and a measured value of each beam in all beam groups.

In some embodiments, when the measurement granularity is actually a beam group measurement granularity, the measurement report configuration information may further instruct the terminal device to send, in the measurement report, the measured values of the M beams and a combined value of measured values of all beams in all the beam groups.

In some embodiments, the combined value of the measured values of all the beams in all the beam groups may be obtained by calculation in a third preset manner.

In some embodiments, the third preset manner may be a plurality of manners in the prior art. For example, the third preset manner may be performing weighted summation on the measured values of all beams in beam groups of all cells, to obtain the combined value, or the third preset manner may be averaging the measured values of all beams in beam groups of all cells, to obtain the combined value.

For example, a quantity of M configured by the access network device to the terminal device is three, and a total of four beam groups currently exist. In this case, the measurement report reported by the terminal device to the access network device includes measured values of three beams having largest measured values in the four beam groups and a measured value of each beam in the currently existing four beam groups. Alternatively, the measurement report reported by the terminal device to the access network device includes measured values of three beams having largest measured values and a combined value of measured values of all beams in the current existing four beam groups.

It should be understood that, the first preset manner, the second preset manner, and the third preset manner may be a same calculation manner, or may be different calculation manners. This is not limited in this embodiment of this disclosure.

It should be understood that, the beam groups of all cells are all beam groups in the serving cell in which the terminal device is located and in another cell other than the serving cell, that is, beam groups in a serving cell in which a current serving beam group of the terminal device is located and beam groups in another cell other than the current serving cell are included.

It should be understood that, during measurement reporting configuration, a quantity of measured values of the current serving beam group included in the measurement report sent by the terminal device to the access network device may be the same as, or may be different from a quantity of measured values of another beam group. This is not limited in this embodiment of this disclosure.

In some embodiments, the measured values of M beams included in the measurement report may be a result selected by the terminal device, or may be a result selected by the terminal device based on a second preset condition preconfigured by the access network device. For example, the second preset condition may be that a measured value of each of the M beams is greater than or equal to a second threshold, and the second threshold may be configured by the access network device.

In some embodiments, the measurement report configuration information may further include reporting manner configuration information. The reporting manner configuration information is used to indicate a manner in which the terminal device reports the measurement report to the access network device. The reporting manner configuration information may include a plurality of reporting manners such as event trigger reporting, periodical reporting, and event-triggered periodical reporting.

In some embodiments, a measurement identifier included in the first message is used to indicate a correspondence between the measurement object and the measurement report configuration information, to link the measurement object with the measurement report configuration information corresponding thereto.

That is, during measurement reporting, the terminal device evaluates and reports, based on the measurement identifier, a measured value of the measurement object corresponding to the measurement report configuration information in the measurement identifier by using the corresponding measurement report configuration information.

In addition, the measurement identifier is further used to uniquely identify measurement reporting of different air interfaces. That is, the access network device uses the measurement identifier included in the measurement report by the terminal device, to determine the cell or beam whose measurement information is currently reported by the terminal device.

It should be understood that, a plurality of measurement identifiers may correspond to a plurality of measurement objects and same measurement report configuration information, or a plurality of measurement identifiers may correspond to one measurement object and a plurality of pieces of measurement report configuration information.

In some embodiments, measurement quantity configuration information included in the first message is used to indicate a related coefficient for layer 3 filtering, including a related coefficient required for intra-frequency and inter-frequency measurement. It should be understood that the related coefficient is used for processing the measurement value.

It should be understood that, in the method 900, a process of interaction between the terminal device and the access network device is described only by using an example in which the first measurement granularity is a beam measurement granularity. However, this embodiment of this disclosure is not limited thereto. This embodiment of this disclosure may further include a measurement method of a cell measurement granularity, a beam group measurement granularity and a TRP measurement granularity.

In some embodiments, before the terminal device performs measurement, the terminal device needs to perform random access.

In some embodiments, the terminal device first needs to perform downlink synchronization, to receive a broadcast message broadcast by the access network device, and the broadcast message includes a correspondence between a downlink beam and a random access resource configuration.

In some embodiments, the random access resource configuration includes a time-frequency resource or preamble division information required for a random access process.

In some embodiments, in the random access process, the terminal device first sends a preamble sequence, and the access network device sends a random access response message RAR on a downlink beam having best signal quality or a downlink beam group having best signal quality. After the access network device sends the random access response message, the terminal device needs to know a downlink beam on which the terminal device receives the random access response message RAR. In this case, the terminal device needs to measure the downlink beam based on the measurement configuration information sent by the access network device, and determines, based on a measurement result, the downlink beam having best signal quality on which the terminal device receives the random access response message RAR, then the terminal device determines a random access resource by using a correspondence that is between the downlink beam and the random access resource configuration and that is included in the received broadcast message, to complete random access, and enter a connected mode.

In some embodiments, after the terminal device enters the connected mode through the random access process, the terminal device may learn of the current serving beam of the terminal device.

In some embodiments, the terminal device may determine, based on identifier information of the current serving beam, the current serving beam of the terminal device.

920. The terminal device measures the current serving beam, to obtain a first measured value.

In some embodiments, the terminal device may obtain the first measured value in a layer 2 combination or layer 2 filtering manner.

930. Compare the first measured value with a measurement threshold, to determine whether another beam needs to be measured.

In some embodiments, the terminal device compares the first measured value with a preset measurement threshold, and when the first measured value is less than the preset measurement threshold, the terminal device determines that a reference signal of some or all of another one or more beams other than the current serving beam needs to be measured.

In some embodiments, when the first measured value is greater than the measurement threshold, it indicates that signal quality of the current serving beam is relatively good, the current serving beam does not need to be switched, and the process ends.

940. If the first measured value is less than or equal to the measurement threshold, the terminal device sends a configuration request message to the access network device.

In some embodiments, the configuration request message is used to request the access network device for configuration information of another one or more beams.

In some embodiments, the configuration request message may be a physical downlink control channel (PDCCH) message, or a media access control control element (MAC CE) message, or a radio resource control (RRC) message or an on-demand system information request on-demand SI request, and the on-demand SI request may be sent by a random access Msg 1 or Msg 3.

950. The access network device sends a second message to the terminal device.

In some embodiments, the second message includes an identifier of one or more beams, and the one or more beams are other beams other than the current serving beam.

In some embodiments, the second message further includes other information required when the another one or more beams other than the current serving beam are measured.

In some embodiments, when the access network device begins to send the first message to the terminal device, the configuration information of another beam is also configured, but the configuration information of the another beam is not sent to the terminal device. In this case, the access network device may directly send the stored configuration information of the another beam as the second message to the terminal device.

In some embodiments, when the access network device begins to send the first message to the terminal device, the configuration information of another beam is not configured for the terminal device. In this case, the access network device needs to first configure the configuration information of the another beam, and send the configuration information as the second message to the terminal device.

In some embodiments, the second message may be a physical downlink control channel (PDCCH) message, or a medium access control control element (MAC CE) message, or a radio resource control (RRC) message.

960. The terminal device measures another one or more beams other than the current serving beam, to obtain a second measured value.

Because the second measured value is a value obtained by measuring another one or more beams by the terminal device, the second measured value may be one value, or may be a plurality of values.

970. The terminal device sends a measurement report to the access network device.

In some embodiments, the measurement report is configured by the terminal device based on the measurement report configuration information sent by the access network device. How the terminal device configures the measurement report based on the measurement report configuration information is described in detail in operation 910, and for brevity, details are not described herein again.

980. The access network device sends the third message to the terminal device, to instruct the terminal device to switch the current serving beam to a target serving beam.

In some embodiments, the access network device may send, based on the measurement report and/or a pre-stipulated criterion or algorithm, the third message to the terminal device.

In some embodiments, the third message includes switching indication information, and the switching indication information is used to instruct the terminal device to switch the current serving beam.

In some embodiments, the third message may include a physical downlink control channel PDCCH message, a medium access control control element MAC CE message, or an RRC message.

In this embodiment of this disclosure, by introducing different measurement types, measurement of different granularities may be implemented, so that the measurement granularity is more refined and measurement results are more accurate.

Method embodiments of this disclosure are described above in detail with reference to FIG. 1 and FIG. 9, and embodiments of the terminal device and embodiments of the access network device of this disclosure are described below in detail with reference to FIG. 10 to FIG. 15. It should be understood that, the terminal device embodiments and the access network device embodiments correspond to the method embodiments. For similar descriptions, refer to the method embodiments.

Figure 10:
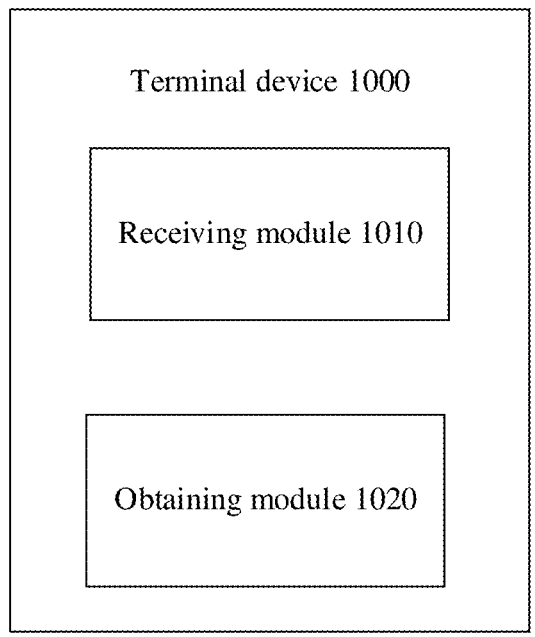
FIG. 10 is a schematic structural diagram of a terminal device according to an embodiment of this disclosure.

FIG. 10 is a schematic block diagram of a terminal device 1000 according to an embodiment of this disclosure. As shown in FIG. 10, the terminal device 1000 includes:

a receiving module 1010, configured to receive a first message sent by an access network device, where the first message includes measurement type information, the measurement type information is used to indicate a first measurement granularity, and the first measurement granularity is one of a cell measurement granularity or a beam measurement granularity; and an obtaining module 1020, configured to obtain a measured value of a measurement object corresponding to the first measurement granularity.

In this embodiment of this disclosure, by introducing different measurement types, measurement of different granularities may be implemented, so that the measurement granularity is more refined and measurement results are more accurate.

In some embodiments, the first message may be a physical downlink control channel (PDCCH) message or a medium access control control element (MAC CE) message.

In some embodiments, the first message may be carried by a connection reconfiguration message of radio resource control (RRC), and sent by the access network device to the terminal device, or may be carried by another RRC signaling and sent by the access network device to the terminal device. This is not limited in this embodiment of this disclosure.

In some embodiments, the first message may further include a measurement threshold corresponding to the first measurement granularity.

In some embodiments, when the first measurement granularity is a cell measurement granularity, the first message further includes a cell identifier of the current serving cell and a cell identifier of another cell other than the current serving cell. The cell identifier is used to indicate different cells, so that the terminal device learns of which cell needs to be measured.

In some embodiments, when the first measurement granularity is a beam measurement granularity, the first message includes a beam identifier of the current serving beam and a beam identifier of another one or more beams other than the current serving beam.

In some embodiments, the beam identifier is used to identify different beams, and the beam identifier may further enable the terminal device to learn of information related to a beam that the terminal device needs to measure, for example, a carrier frequency or frequency, a measured bandwidth, and a frequency offset value of the beam that the terminal device needs to measure, or some other indication information that may be used to indicate the beam.

In some embodiments, the first message may further include a measurement object.

When the first measurement granularity is a beam measurement granularity, the measurement object may be a reference signal of the current serving beam, or may be a reference signal of another beam other than the current serving beam.

In some embodiments, the reference signal may be referred to as a beam reference signal (BRS), and the BRS may be a channel state information-reference signal (CSI-RS), may be a demodulation reference signal (DM-RS), or may be a synchronization signal block (SS block), or another reference signal. This embodiment of this disclosure is not limited thereto.

In some embodiments, a reference signal of the current serving beam is measured, to obtain a first measured value; and a reference signal of some or all of another one or more beams other than the current serving beam is measured, to obtain a second measured value.

The second measured value may be one value, or may be a plurality of values.

When the first measurement granularity is a cell measurement granularity, the measurement object may include a cell reference signal CRS of the current serving cell, or may include a cell reference signal CRS of another cell other than the current serving cell.

In some embodiments, the first message may further include at least one of measurement report configuration information, a measurement identifier, and measurement quantity configuration information.

In some embodiments, when the first measurement granularity is a beam measurement granularity, the measurement report configuration information is used to instruct the terminal device to send a measured value of each of N beams and/or a combined value of measured values of the N beams in the measurement report.

In some embodiments, a quantity of N is configured by the access network device, and N is a positive integer greater than or equal to 1.

It should be understood that, the combined value of measured values of the N beams is a value obtained by the terminal device in a first preset manner. The first preset manner may be a plurality of manners in the prior art. For example, the first preset manner may be performing weighted summation on the N measured values, to obtain the combined value, or the first preset manner may be averaging the N measured values, to obtain the combined value.

It should be further understood that, the measured values of the N beams may include the first measured value and the second measured value, that is, may be the measured value of the current serving beam, or may be the measured value of another beam other than the current serving beam.

In some embodiments, the terminal device may obtain the measured value in a plurality of manners. For example, the terminal device may use a layer 2 combination and/or layer 2 filtering manner. For example, the layer 2 may be a media access control (MAC) layer, a radio link control (RLC) layer, or a packet data convergence protocol (PDCP) layer, to obtain a measured value of a BRS of the current serving beam and a measured value of a BRS of another beam other than the current serving beam.

It should be understood that, the measured values of the N beams included in the measurement report may be a result selected by the terminal device. For example, the terminal device selects measured values of first N beams that have largest measured values in all beams. Alternatively, the measured values of the N beams included in the measurement report may be a result selected by the terminal device based on a first preset condition preconfigured by the access network device. For example, the first preset condition may be that a measured value of each of the N beams is greater than or equal to a first threshold, and the first threshold may be configured by the access network device.

In some embodiments, when a quantity of corresponding beams whose measured values are greater than or equal to a first threshold is greater than N, the measured values of first N beams in the corresponding beams whose measured values are greater than or equal to the first threshold may be selected as content of the measurement report.

It should be understood that, when the first measurement granularity is a beam measurement granularity, the terminal device may report, when reporting a measurement result to the access network device, a measured value of each of the selected N beams to the access network device, so that the access network device determines, based on the measured value, whether to switch the current serving beam. In other words, the measurement report configuration information instructs the terminal device to send the measured value of each of the N beams in the measurement report. The terminal device may alternatively combine the measured values of the N beams into a combined value, and then report the combined value to the access network device. In other words, the measurement report configuration information instructs the terminal device to send the combined value of the measured values of the N beams in the measurement report. The method in which the terminal device combines the measured values of the N beams to obtain the combined value may be any one of a plurality of methods in the prior art. For example, the method may be performing weighted summation on the N measured values or averaging the N measured values. This is not limited in this embodiment of this disclosure. The terminal device may further simultaneously report the measured values of the N beams and the combined value of the measured values of the N beams to the access network device. In other words, the measurement report configuration information may further instruct the terminal device to send the measured value of each of the N beams and the combined value of the measured values of the N beams in the measurement report.

In some embodiments, when the first measurement granularity is a beam measurement granularity and the beam is actually a beam group including a plurality of beams, the measurement report configuration information may instruct the terminal device to send, in the measurement report, measured values of M beams and a measured value of each beam in the beam group in which the M beams are located.

In some embodiments, when the measurement granularity is actually a beam group measurement granularity, the measurement report configuration information may further instruct the terminal device to send, in the measurement report, the measured values of the M beams and a combined value of measured values of all beams in the beam group in which the M beams are located.

In some embodiments, a quantity of M is configured by the access network device, and M is a positive integer greater than or equal to 1.

In some embodiments, the combined value of the measured values of all the beams in the beam group in which the M beams are located may be obtained by calculation in a second preset manner.

In some embodiments, the second preset manner may be a plurality of manners in the prior art. For example, the second preset manner may be performing weighted summation on the M measured values, to obtain the combined value, or the second preset manner may be averaging the M measured values, to obtain the combined value.

For example, a quantity of M configured by the access network device to the terminal device is three, and two of the three beams are from a first beam group, and the other beam is from a second beam group. In this case, the measurement report reported by the terminal device to the access network device includes measured values of the three beams and a measured value of each beam in the first beam group and the second beam group in which the three beams are located. Alternatively, the measurement report reported by the terminal device to the access network device includes measured values of the three beams, a combined value of measured values of all beams in the first beam group in which the three beams are located, and a combined value of measured values of all beams in the second beam group in which the three beams are located.

In some embodiments, when the measurement granularity is actually a beam group measurement granularity, the measurement report configuration information may further instruct the terminal device to send, in the measurement report, the measured values of the M beams and a measured value of each beam in all beam groups.

In some embodiments, when the measurement granularity is actually a beam group measurement granularity, the measurement report configuration information may further instruct the terminal device to send, in the measurement report, the measured values of the M beams and a combined value of measured values of all beams in all the beam groups.

In some embodiments, the combined value of the measured values of all the beams in all the beam groups may be obtained by calculation in a third preset manner.

In some embodiments, the third preset manner may be a plurality of manners in the prior art. For example, the third preset manner may be performing weighted summation on the measured values of all beams in beam groups of all cells, to obtain the combined value, or the third preset manner may be averaging the measured values of all beams in beam groups of all cells, to obtain the combined value.

For example, a quantity of M configured by the access network device to the terminal device is three, and a total of four beam groups currently exist. In this case, the measurement report reported by the terminal device to the access network device includes measured values of three beams having largest measured values in the four beam groups and a measured value of each beam in the currently existing four beam groups. Alternatively, the measurement report reported by the terminal device to the access network device includes measured values of three beams having largest measured values and a combined value of measured values of all beams in the current existing four beam groups.

It should be understood that, the first preset manner, the second preset manner, and the third preset manner may be a same calculation manner, or may be different calculation manners. This is not limited in this embodiment of this disclosure.

It should be understood that, the beam groups of all cells are all beam groups in the serving cell in which the terminal device is located and in another cell other than the serving cell, that is, beam groups in a serving cell in which a current serving beam group of the terminal device is located and beam groups in another cell other than the current serving cell are included.

It should be understood that, during measurement reporting configuration, a quantity of measured values of the current serving beam group included in the measurement report sent by the terminal device to the access network device may be the same as, or may be different from a quantity of measured values of another beam group. This is not limited in this embodiment of this disclosure.

In some embodiments, the measured values of M beams included in the measurement report may be a result selected by the terminal device, or may be a result selected by the terminal device based on a second preset condition preconfigured by the access network device. For example, the second preset condition may be that a measured value of each of the M beams is greater than or equal to a second threshold, and the second threshold may be configured by the access network device.

In some embodiments, the measurement report configuration information may further include reporting manner configuration information. The reporting manner configuration information is used to indicate a manner in which the terminal device reports the measurement report to the access network device. The reporting manner configuration information may include a plurality of reporting manners such as event trigger reporting, periodical reporting, and event-triggered periodical reporting.

In some embodiments, a measurement identifier included in the first message is used to indicate a correspondence between the measurement object and the measurement report configuration information, to link the measurement object with the measurement report configuration information corresponding thereto.

That is, during measurement reporting, the terminal device evaluates and reports, based on the measurement identifier, a measured value of the measurement object corresponding to the measurement report configuration information in the measurement identifier by using the corresponding measurement report configuration information.

In addition, the measurement identifier is further used to uniquely identify measurement reporting of different air interfaces. That is, the access network device uses the measurement identifier included in the measurement report by the terminal device, to determine the cell or beam whose measurement information is currently reported by the terminal device.

It should be understood that, a plurality of measurement identifiers may correspond to a plurality of measurement objects and same measurement report configuration information, or a plurality of measurement identifiers may correspond to one measurement object and a plurality of pieces of measurement report configuration information.

In some embodiments, measurement quantity configuration information included in the first message is used to indicate a related coefficient for layer 3 filtering, including a related coefficient required for intra-frequency and inter-frequency measurement. It should be understood that the related coefficient is used for processing the measurement value.

It should be understood that, when the first measurement granularity is a cell measurement granularity, the measurement report configuration information, the measurement identifier, and the measurement quantity information that are included in the first message share a same function with those in the prior art. For brevity, details are not described herein again.

In some embodiments, when the first measurement granularity is a beam measurement granularity, the first message may include information related to another one or more beams other than the current serving beam, for example, a beam identifier of the another one or more beams and other information. In this case, the obtaining module 1020 is specifically configured to: measure a reference signal of the current serving beam, to obtain a first measured value of the current serving beam; and measure a reference signal of some or all of the one or more beams if the first measured value is less than or equal to the measurement threshold, to obtain the second measured value.

In this case, because the first message includes not only information related to the current serving beam, but also information related to another beam other than the current serving beam, after determining that the first measured value is less than the measurement threshold, the terminal device may directly measure, based on the information related to the another beam configured by the access network device, the another beam, to obtain the second measured value.

Figure 11:
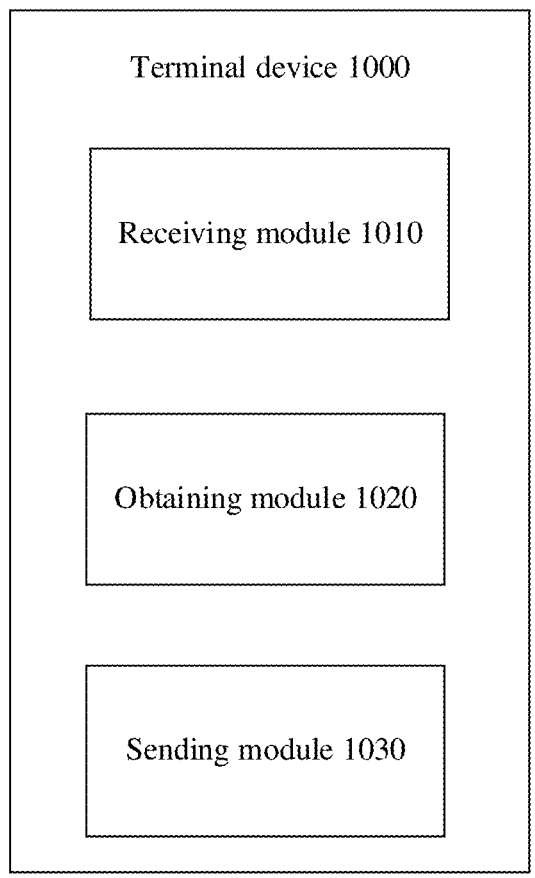
FIG. 11 is another schematic structural diagram of a terminal device according to an embodiment of this disclosure.

In some embodiments, as shown in FIG. 11, the terminal device 1000 further includes a sending module 1030. The sending module 1030 is configured to send a configuration request message to the access network device if the first measured value is less than or equal to the measurement threshold, where the configuration request message is used to request the access network device to send information about another beam other than the current serving beam.

In some embodiments, the configuration request message may be a physical downlink control channel (PDCCH) message, or a medium access control control element (MAC CE) message, or a radio resource control (RRC) message or an on-demand system information request on-demand SI request, and the on-demand SI request may be sent by a random access Msg 1 or Msg 3.

The terminal device sends the configuration request message to the access network device if the first message includes only the information related to the current serving beam, and does not include the information related to the another beam other than the current serving beam.

In this case, the receiving module 1010 is further configured to receive a second message sent by the access network device, where the second message includes a beam identifier of one or more beams other than the current serving beam.

The obtaining module 1020 is further configured to measure a reference signal of some or all of the one or more beams, to obtain the second measured value.

In some embodiments, the second message is a physical downlink control channel PDCCH message, a media access control control element MAC CE message, or a radio resource control RRC message.

In some embodiments, the sending module 1030 is further configured to send a measurement report to the access network device, where the measurement report includes N measured values and/or a combined value of N measured values.

The combined value of the N measured values is determined in a first preset manner.

In some embodiments, a quantity of N is a positive integer greater than or equal to 1, and the quantity of N is configured by the access network device.

In some embodiments, when the beam in the beam measurement granularity is a plurality of beams, that is, the actual measurement granularity is a beam group measurement granularity, the measurement report includes measured values of M beams and/or a measured value of each beam in the beam group in which the M beams are located.

In some embodiments, when the actual measurement granularity is a beam group measurement granularity, the measurement report may further include the measured values of the M beams and/or a combined value of measured values of all beams in the beam group in which the M beams are located.

The combined value of the measured values of all the beams in the beam group in which the M beams are located may be determined in a second preset manner.

In some embodiments, when the actual measurement granularity is a beam group measurement granularity, the measurement report may further include the measured values of the M beams and/or a measured value of each beam in all beam groups.

In some embodiments, when the actual measurement granularity is a beam group measurement granularity, the measurement report may further include the measured values of the M beams and/or a combined value of measured values of all beams in all the beam groups.

The combined value of the measured values of all the beams in the all the beam groups may be determined in a third preset manner.

It should be understood that, the first preset manner, the second preset manner, and the third preset manner may be a same calculation manner, or may be different calculation manners. This is not limited in this embodiment of this disclosure.

In some embodiments, the receiving module 1010 is further configured to receive a third message sent by the access network device, where the third message includes switching indication information, to instruct the terminal device to switch the current serving cell or the current serving beam to a target cell or a target beam indicated by the switching indication information.

In some embodiments, the third message may be a PDCCH message, a MAC CE message or an RRC message.

It should be understood that, the terminal device 1000 in this embodiment of this disclosure may correspond to the terminal device in the embodiments of this disclosure, and the foregoing and other operations and/or functions of modules in the terminal device 1000 separately implement corresponding procedures of the foregoing methods shown in FIG. 1 to FIG. 9. For brevity, details are not described herein again.

Figure 12:
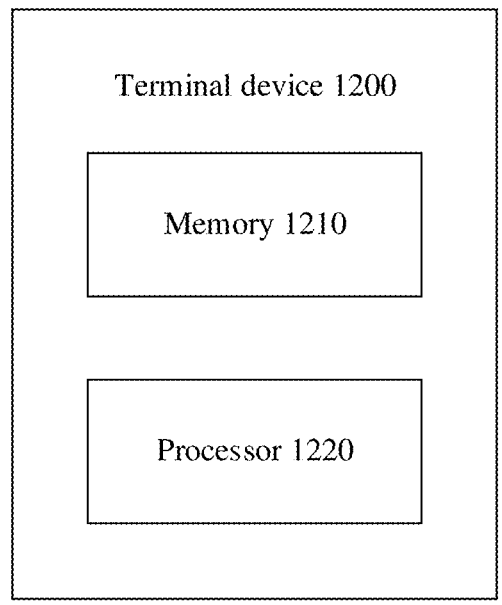
FIG. 12 is another schematic structural diagram of a terminal device according to an embodiment of this disclosure.

FIG. 12 is a schematic structural diagram of a terminal device 1200 according to an embodiment of this disclosure. As shown in FIG. 12, the terminal device 1200 includes a memory 1210 and a processor 1220. The memory 1210 and the processor 1220 communicate with each other, and transmit a control and/or data signal through an internal connection channel.

The memory 1210 is configured to store program code.

The processor 1220 is configured to invoke the program code to implement the methods in the foregoing embodiments of this disclosure.

In this embodiment of this disclosure, the processor 1220 may be a central processing unit (CPU), a network processor (NP), or a combination of a CPU and an NP. The processor may further include a hardware chip. The foregoing hardware chip may be a disclosure-specific integrated circuit (ASIC), a programmable logic device (PLD), or a combination thereof.

An embodiment of this disclosure provides a computer-readable medium, configured to store computer program code, and the computer program includes an instruction configured to perform the measurement method in the embodiments of this disclosure in FIG. 1 to FIG. 9. The readable medium may be a read-only memory (ROM) or a random access memory (RAM). This is not limited in this embodiment of this disclosure.

It should be understood that, the terminal device 1200 in this embodiment of this disclosure may correspond to the terminal device in the embodiments of this disclosure, and the foregoing and other operations and/or functions of modules in the terminal device 1200 separately implement corresponding procedures of the foregoing methods shown in FIG. 1 to FIG. 9. For brevity, details are not described herein again.

Figure 13:
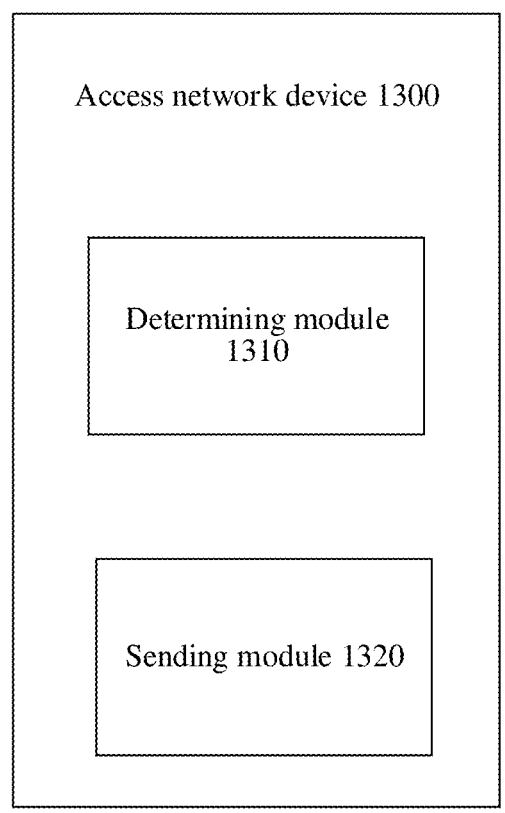
FIG. 13 is a schematic structural diagram of an access network device according to an embodiment of this disclosure.

FIG. 13 is a schematic structural diagram of an access network device 1300 according to an embodiment of this disclosure. As shown in FIG. 13, the access network device 1300 includes:

a determining module 1310, configured to determine a first measurement granularity as a cell measurement granularity or a beam measurement granularity; and a sending module 1320, configured to send a first message to a terminal device, where the first message includes measurement type information, and the measurement type information is used to indicate the first measurement granularity.

In this embodiment of this disclosure, by introducing different measurement types, measurement of different granularities may be implemented, so that the measurement granularity is more refined and measurement results are more accurate.

It should be understood that, when the measurement granularity is a beam measurement granularity, the beam may be one beam, or a beam group formed by a plurality of beams or a transmission reception point (transmission reception point, TRP). Therefore, when the first measurement granularity is a beam measurement granularity, the measurement granularity in this case may actually be one of a beam measurement granularity, a beam group measurement granularity and a TRP measurement granularity.

In some embodiments, the first message may be a physical downlink control channel (PDCCH) message or a medium access control control element (MAC CE) message.

In some embodiments, the first message may be carried by a connection reconfiguration message of radio resource control (RRC), and sent by the access network device to the terminal device, or may be carried by another RRC signaling and sent by the access network device to the terminal device. This is not limited in this embodiment of this disclosure.

In some embodiments, the first message further includes a measurement threshold corresponding to the first measurement granularity.

In some embodiments, when the first measurement granularity is a beam measurement granularity, the first message further includes an identifier of one or more beams, where the one or more beams are other beams other than the current serving beam, and the beam identifiers are used to indicate different beams, so that the terminal device may know which beam needs to be measured.

It should be understood that the first message may alternatively include an identifier of the current serving beam.

In some embodiments, when the first measurement granularity is a cell measurement granularity, the first message includes a cell identifier of the current serving cell and a cell identifier of another cell other than the current serving cell. The cell identifier is used to indicate different cells, so that the terminal device learns of which cell needs to be measured.

In some embodiments, the first message may further include at least one of measurement report configuration information, a measurement identifier, and measurement quantity configuration information.

In some embodiments, when the first measurement granularity is a beam measurement granularity, the measurement report configuration information is used to instruct the terminal device to send a measured value of each of N beams and/or a combined value of measured values of the N beams in the measurement report.

In some embodiments, a quantity of N is configured by the access network device, and N is a positive integer greater than or equal to 1.

It should be understood that, the combined value of measured values of the N beams is a value obtained by the terminal device in a first preset manner. The first preset manner may be a plurality of manners in the prior art. For example, the first preset manner may be performing weighted summation on the N measured values, to obtain the combined value, or the first preset manner may be averaging the N measured values, to obtain the combined value.

It should be further understood that, the measured values of the N beams may include the first measured value and the second measured value, that is, may be the measured value of the current serving beam, or may be the measured value of another beam other than the current serving beam.

In some embodiments, the terminal device may obtain the measured value in a plurality of manners. For example, the terminal device may use a layer 2 combination and/or layer 2 filtering manner. For example, the layer 2 may be a media access control (MAC) layer, a radio link control (RLC) layer, or a packet data convergence protocol (PDCP) layer, to obtain a measured value of a BRS of the current serving beam and a measured value of a BRS of another beam other than the current serving beam.

It should be understood that, the measured values of the N beams included in the measurement report may be a result selected by the terminal device. For example, the terminal device selects measured values of first N beams that have largest measured values in all beams. Alternatively, the measured values of the N beams included in the measurement report may be a result selected by the terminal device based on a first preset condition preconfigured by the access network device. For example, the first preset condition may be that a measured value of each of the N beams is greater than or equal to a first threshold, and the first threshold may be configured by the access network device.

In some embodiments, when a quantity of corresponding beams whose measured values are greater than or equal to a first threshold is greater than N, the measured values of first N beams in the corresponding beams whose measured values are greater than or equal to the first threshold may be selected as content of the measurement report.

It should be understood that, when the first measurement granularity is a beam measurement granularity, the terminal device may report, when reporting a measurement result to the access network device, a measured value of each of the selected N beams to the access network device, so that the access network device determines, based on the measured value, whether to switch the current serving beam. In other words, the measurement report configuration information instructs the terminal device to send the measured value of each of the N beams in the measurement report. The terminal device may alternatively combine the measured values of the N beams into a combined value, and then report the combined value to the access network device. In other words, the measurement report configuration information instructs the terminal device to send the combined value of the measured values of the N beams in the measurement report. The method in which the terminal device combines the measured values of the N beams to obtain the combined value may be any one of a plurality of methods in the prior art. For example, the method may be performing weighted summation on the N measured values or averaging the N measured values. This is not limited in this embodiment of this disclosure. The terminal device may further simultaneously report the measured values of the N beams and the combined value of the measured values of the N beams to the access network device. In other words, the measurement report configuration information may further instruct the terminal device to send the measured value of each of the N beams and the combined value of the measured values of the N beams in the measurement report.

In some embodiments, when the first measurement granularity is a beam measurement granularity and the beam is actually a beam group including a plurality of beams, the measurement report configuration information may instruct the terminal device to send, in the measurement report, measured values of M beams and a measured value of each beam in the beam group in which the M beams are located.

In some embodiments, when the measurement granularity is actually a beam group measurement granularity, the measurement report configuration information may further instruct the terminal device to send, in the measurement report, the measured values of the M beams and a combined value of measured values of all beams in the beam group in which the M beams are located.

In some embodiments, a quantity of M is configured by the access network device, and M is a positive integer greater than or equal to 1.

In some embodiments, the combined value of the measured values of all the beams in the beam group in which the M beams are located may be obtained by calculation in a second preset manner.

In some embodiments, the second preset manner may be a plurality of manners in the prior art. For example, the second preset manner may be performing weighted summation on the M measured values, to obtain the combined value, or the second preset manner may be averaging the M measured values, to obtain the combined value.

For example, a quantity of M configured by the access network device to the terminal device is three, and two of the three beams are from a first beam group, and the other beam is from a second beam group. In this case, the measurement report reported by the terminal device to the access network device includes measured values of the three beams and a measured value of each beam in the first beam group and the second beam group in which the three beams are located. Alternatively, the measurement report reported by the terminal device to the access network device includes measured values of the three beams, a combined value of measured values of all beams in the first beam group in which the three beams are located, and a combined value of measured values of all beams in the second beam group in which the three beams are located.

In some embodiments, when the measurement granularity is actually a beam group measurement granularity, the measurement report configuration information may further instruct the terminal device to send, in the measurement report, the measured values of the M beams and a measured value of each beam in all beam groups.

In some embodiments, when the measurement granularity is actually a beam group measurement granularity, the measurement report configuration information may further instruct the terminal device to send, in the measurement report, the measured values of the M beams and a combined value of measured values of all beams in all the beam groups.

In some embodiments, the combined value of the measured values of all the beams in all the beam groups may be obtained by calculation in a third preset manner.

In some embodiments, the third preset manner may be a plurality of manners in the prior art. For example, the third preset manner may be performing weighted summation on the measured values of all beams in beam groups of all cells, to obtain the combined value, or the third preset manner may be averaging the measured values of all beams in beam groups of all cells, to obtain the combined value.

For example, a quantity of M configured by the access network device to the terminal device is three, and a total of four beam groups currently exist. In this case, the measurement report reported by the terminal device to the access network device includes measured values of three beams having largest measured values in the four beam groups and a measured value of each beam in the currently existing four beam groups. Alternatively, the measurement report reported by the terminal device to the access network device includes measured values of three beams having largest measured values and a combined value of measured values of all beams in the current existing four beam groups.

It should be understood that, the first preset manner, the second preset manner, and the third preset manner may be a same calculation manner, or may be different calculation manners. This is not limited in this embodiment of this disclosure.

It should be understood that, the beam groups of all cells are all beam groups in a serving cell in which the terminal device is located and in another cell other than the serving cell, that is, beam groups in a serving cell in which a current serving beam group of the terminal device is located and beam groups in another cell other than the current serving cell are included.

It should be understood that, during measurement reporting configuration, a quantity of measured values of the current serving beam group included in the measurement report sent by the terminal device to the access network device may be the same as, or may be different from a quantity of measured values of another beam group. This is not limited in this embodiment of this disclosure.

In some embodiments, the measured values of M beams included in the measurement report may be a result selected by the terminal device, or may be a result selected by the terminal device based on a second preset condition preconfigured by the access network device. For example, the second preset condition may be that a measured value of each of the M beams is greater than or equal to a second threshold, and the second threshold may be configured by the access network device.

In some embodiments, the measurement report configuration information may further include reporting manner configuration information. The reporting manner configuration information is used to indicate a manner in which the terminal device reports the measurement report to the access network device. The reporting manner configuration information may include a plurality of reporting manners such as event trigger reporting, periodical reporting, and event-triggered periodical reporting.

In some embodiments, a measurement identifier included in the first message is used to indicate a correspondence between the measurement object and the measurement report configuration information, to link the measurement object with the measurement report configuration information corresponding thereto.

That is, during measurement reporting, the terminal device evaluates and reports, based on the measurement identifier, a measured value of the measurement object corresponding to the measurement report configuration information in the measurement identifier by using the corresponding measurement report configuration information.

In addition, the measurement identifier is further used to uniquely identify measurement reporting of different air interfaces. That is, the access network device uses the measurement identifier included in the measurement report by the terminal device, to determine the cell or beam whose measurement information is currently reported by the terminal device.

It should be understood that, a plurality of measurement identifiers may correspond to a plurality of measurement objects and same measurement report configuration information, or a plurality of measurement identifiers may correspond to one measurement object and a plurality of pieces of measurement report configuration information.

In some embodiments, measurement quantity configuration information included in the first message is used to indicate a related coefficient for layer 3 filtering, including a related coefficient required for intra-frequency and inter-frequency measurement. It should be understood that the related coefficient is used for processing the measurement value.

It should be understood that, when the first measurement granularity is a cell measurement granularity, the measurement report configuration information, the measurement identifier, and the measurement quantity information that are included in the first message share a same function with those in the prior art. For brevity, details are not described herein again.

Figure 14:
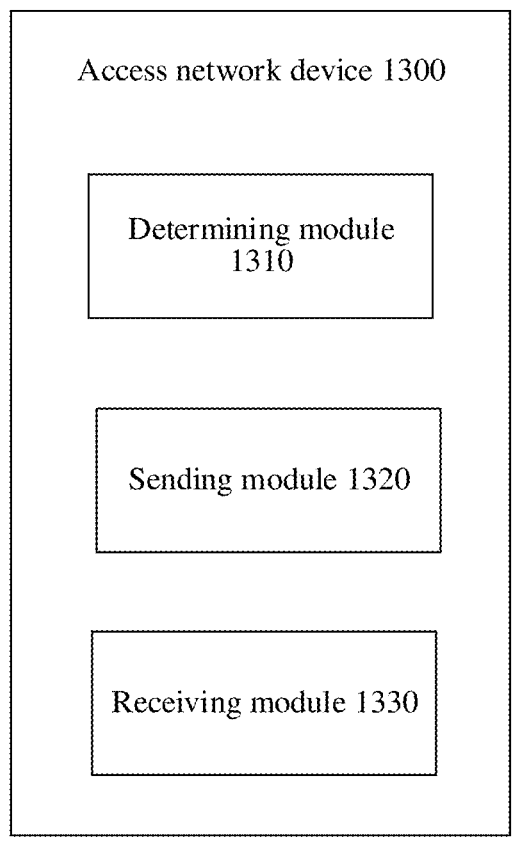
FIG. 14 is another schematic structural diagram of an access network device according to an embodiment of this disclosure.

In some embodiments, as shown in FIG. 14, the access network device 1300 further includes:

a receiving module 1330, configured to receive a configuration request message sent by a terminal device, where the configuration request message is used to request an access network device to send information about another beam other than a current serving beam.

In some embodiments, the configuration request message may be a physical downlink control channel (PDCCH) message, or a medium access control control element (MAC CE) message, or a radio resource control (RRC) message or an on-demand system information request on-demand SI request, and the on-demand SI request may be sent by a random access Msg 1 or Msg 3.

In some embodiments, the sending module 1320 is further configured to send a second message to the terminal device, where the second message includes an identifier of one or more beams, and the one or more beams are other beams other than the current serving beam.

In this case, the first message sent by the access network device 1300 to the terminal device does not include information related to another beam other than the current serving beam. Therefore, the access network device 1300 needs to receive the configuration request message sent by the terminal device.

In some embodiments, the second message is a physical downlink control channel PDCCH message, a media access control control element MAC CE message, or a radio resource control RRC message.

In some embodiments, the sending module 1320 is further configured to send a third message to the terminal device, where the third message includes switching indication information, to instruct the terminal device to switch the current serving cell or the current serving beam to a target cell or a target beam indicated by the switching indication information.

In some embodiments, the third message may be a PDCCH message, a MAC CE message or an RRC message.

It should be understood that, the access network device 1300 in this embodiment of this disclosure may correspond to the access network device in the embodiments of this disclosure, and the foregoing and other operations and/or functions of modules in the access network device 1300 separately implement corresponding procedures of the foregoing methods shown in FIG. 1 to FIG. 9. For brevity, details are not described herein again.

Figure 15:
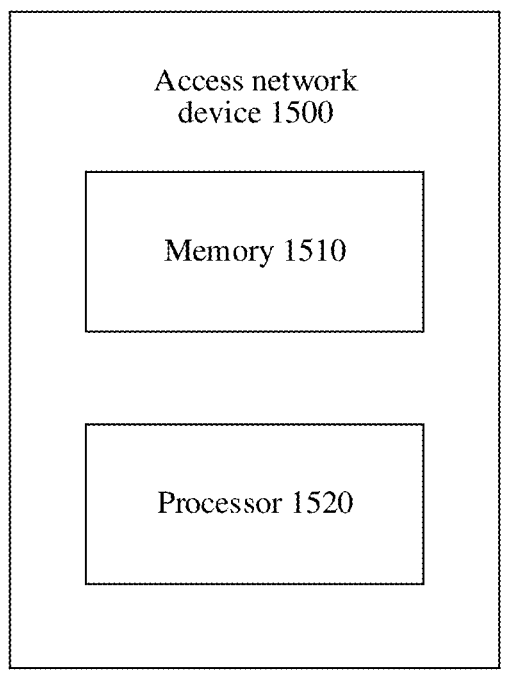
FIG. 15 is another schematic structural diagram of an access network device according to an embodiment of this disclosure.

FIG. 15 is a schematic structural diagram of an access network device 1500 according to an embodiment of this disclosure. As shown in FIG. 15, the access network device 1500 includes a memory 1510 and a processor 1520. The memory 1510 and the processor 1520 communicate with each other, and transmit a control and/or data signal through an internal connection channel.

The memory 1510 is configured to store program code.

The processor 1520 is configured to invoke the program code to implement the methods in the foregoing embodiments of this disclosure.

In this embodiment of this disclosure, the processor 1520 may be a central processing unit (CPU), a network processor (NP), or a combination of a CPU and an NP. The processor may further include a hardware chip. The hardware chip may be an disclosure-specific integrated circuit (ASIC), a programmable logic device (PLD), or a combination thereof.

An embodiment of this disclosure provides a computer-readable medium, configured to store computer program code, and the computer program includes an instruction configured to perform the measurement method in the embodiments of this disclosure in FIG. 1 to FIG. 9. The readable medium may be a read-only memory (ROM) or a random access memory (RAM). This is not limited in this embodiment of this disclosure.

It should be understood that, the access network device 1500 in this embodiment of this disclosure may correspond to the access network device in the embodiments of this disclosure, and the foregoing and other operations and/or functions of modules in the access network device 1500 separately implement corresponding procedures of the foregoing methods shown in FIG. 1 to FIG. 9. For brevity, details are not described herein again.

An embodiment of this disclosure further provides a system chip. The system chip includes an input/output interface, at least one processor, at least one memory, and a bus. The at least one memory is configured to store an instruction, and the at least one processor is configured to invoke the instruction in the at least one memory, to perform operations of the methods according to the foregoing aspects.

It should be understood that, the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm operations may be implemented by using electronic hardware or a combination of computer software and electronic hardware. Whether the functions are performed by using hardware or software depends on particular disclosures and design constraint conditions of the technical solutions. A person skilled in the art may use different methods to implement the described functions for the particular disclosures, but it should not be considered that the embodiment goes beyond the scope of this disclosure.

It may be clearly understood by a person skilled in the art that, for the purpose of convenient and brief description, for a specific working process of the foregoing system, apparatus, and unit, refer to a corresponding process in the foregoing method embodiments. Details are not described herein again.

In the several embodiments provided in this disclosure, it should be understood that the disclosed system, apparatus, and method may be implemented in other manners. For example, the described apparatus embodiment is merely an example. For example, the unit division is merely logical function division and may be other division in some embodiments. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, function units in the embodiments of this disclosure may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedures or functions according to the embodiments of this disclosure are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

The foregoing descriptions are merely example embodiments of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A measurement method comprising:
   receiving a first message sent by an access network device, wherein the first message comprises measurement type information, the measurement type information is used to indicate a first measurement granularity, and the first measurement granularity is one of a cell measurement granularity or a beam measurement granularity; and
   obtaining a measured value of a measurement object, the measurement object corresponding to the first measurement granularity,
   wherein the first message farther comprises measurement report configuration information and a measurement identifier, wherein the measurement report configuration information includes reporting manner configuration information, wherein the measurement identifier is used to indicate a correspondence between a measurement object and the measurement report configuration information.

2. The method according to claim 1, wherein the first message further comprises a measurement threshold corresponding to the first measurement granularity.

3. The method according to claim 2, wherein the first measurement granularity is a beam measurement granularity, the first message further comprises a beam identifier of one or more beams, the measurement object comprises a current serving beam and some or all of the one or more beams, and the measured value comprises a first measured value and a second measured value; and
   obtaining the measured value of the measurement object corresponding to the first measurement granularity comprises:
   measuring a reference signal of the current serving beam, to obtain the first measured value of the current serving beam; and
   measuring a reference signal of some or all of the one or more beams if the first measured value is less than or equal to the measurement threshold, to obtain the second measured value.

4. The method according to claim 3, wherein the reference signal comprises one or more of the following: a channel state information-reference signal (CSI-RS), a demodulation reference signal (DMRS), or a synchronization signal block (SS block).

5. The method according to claim 2, wherein the first measurement granularity is a beam measurement granularity, the measurement object comprises a current serving beam, and the measured value comprises a first measured value; and
   obtaining the measured value of the measurement object corresponding to the first measurement granularity comprises:
   measuring a reference signal of the current serving beam, to obtain the first measured value of the current serving beam.

6. The method according to claim 1, wherein after the obtaining the measured value of the measurement object corresponding to the first measurement granularity, the method further comprises:
   sending a measurement report to the access network device, wherein
   the measurement report comprises the measured value of each of N beams; or
   the measurement report comprises a combined value, and the combined value is of the measured values of the N beams, wherein N is a positive integer; and
   the measured value of each of the N beams is greater than or equal to a first threshold.

7. The method according to claim 1, wherein the first message is a media access control control element (MAC CE) message or a radio resource control (RRC) message.

8. A device comprising:
   a processor; and
   a non-transitory computer-readable storage medium storing a program to be executed by the processor, the program including instructions to:
   receive a first message sent by an access network device, wherein the first message comprises measurement type information for indicating a first measurement granularity, and the first measurement granularity is one of a cell measurement granularity or a beam measurement granularity; and
   obtain a measured value of a measurement object, the measurement object corresponding to the first measurement granularity, wherein the first message farther comprises measurement report configuration information and a measurement identifier, wherein the measurement report configuration information includes reporting manner configuration information, wherein the measurement identifier is used to indicate a correspondence between a measurement object and the measurement report configuration information.

9. The device according to claim 8, wherein the first message further comprises a measurement threshold corresponding to the first measurement granularity.

10. The device according to claim 9, wherein the first measurement granularity is a beam measurement granularity, the first message further comprises a beam identifier of one or more beams, the measurement object comprises a current serving beam and some or all of the one or more beams, and the measured value comprises a first measured value and a second measured value; and the instructions further to:

measure a reference signal of the current serving beam, to obtain the first measured value of the current serving beam; and measure a reference signal of some or all of the one or more beams if the first measured value is less than or equal to the measurement threshold, to obtain the second measured value.

11. The device according to claim 10, wherein the reference signal comprises one or more of the following: a channel state information-reference signal (CSI-RS), a demodulation reference signal (DMRS), or a synchronization signal block (SS block).

12. The device according to claim 9, wherein the first measurement granularity is a beam measurement granularity, the measurement object comprises a current serving beam, and the measured value comprises a first measured value; and the instructions further to:

measure a reference signal of the current serving beam, to obtain the first measured value of the current serving beam.

13. The device according to claim 8, wherein the instructions further to send a measurement report to the access network device, wherein the measurement report comprises the measured value of each of N beams; or the measurement report comprises a combined value, and the combined value is of measured values of N beams, wherein N is a positive integer; and the measured value of each of the N beams is greater than or equal to a first threshold.

14. The device according to claim 8, wherein the first message is a media access control control element (MAC CE) message or a radio resource control (RRC) message.

15. A device, comprising:
a processor; and
a non-transitory computer-readable storage medium storing a program to be executed by the processor, the program including instructions to:
determine a first measurement granularity as a cell measurement granularity or a beam measurement granularity; and
send a first message to a terminal device, wherein the first message comprises measurement type information, and the measurement type information is used to indicate the first measurement granularity,
wherein the first message farther comprises measurement report configuration information and a measurement identifier, wherein the measurement report configuration information includes reporting manner configuration information, wherein the measurement identifier is used to indicate a correspondence between a measurement object and the measurement report configuration information.

16. The device according to claim 15, wherein the first message further comprises a measurement threshold corresponding to the first measurement granularity.

17. The device according to claim 15, wherein the instructions further to:

receive a configuration request message sent by the terminal device, wherein the configuration request message is used to request the device to send information about another beam other than a current serving beam; and send a second message to the terminal device, wherein the second message comprises an identifier of one or more beams, and the one or more beams are other beams other than the current serving beam.

18. The device according to claim 17, wherein the instructions further to receive a measurement report sent by the terminal device, wherein the measurement report comprises the measured value of each of N beams; or the measurement report comprises a combined value, and the combined value is of measured values of N beams, wherein N is a positive integer; and the measured value of each of the N beams is greater than or equal to a first threshold.

19. The device according to claim 15, wherein the first message further comprises measurement report configuration information, the measurement report configuration information instructs the terminal device to send a measured value of each of N beams in a measurement report, or the measurement report configuration information instructs the terminal device to send a combined value of measured values of a N beams in a measurement report, and N is a positive integer greater than or equal to 1.

20. The device according to claim 15, wherein the first message is a media access control control element (MAC CE) message or a radio resource control (RRC) message.

* * * * *

UNITED STATES PATENT AND TRADEMARK OFFICE
CERTIFICATE OF CORRECTION

PATENT NO. : 11,297,517 B2
APPLICATION NO. : 16/749307
DATED : April 5, 2022
INVENTOR(S) : Haifeng Yu and Xin Xiong It is certified that error appears in the above-identified patent and that said Letters Patent is hereby corrected as shown below:

In the Claims

Claim 1, Column 55, Line 60, delete "farther" and insert --further--.

Claim 1, Column 55, Line 65, delete "between a measure-" and insert --between the measure- --.

Claim 8, Column 57, Line 1, delete "farther" and insert --further--.

Claim 8, Column 57, Line 6, delete "between a measure-" and insert --between the measure- --.

Claim 15, Column 58, Line 13, delete "farther" and insert --further--.

Signed and Sealed this
Fifth Day of July, 2022

*Katherine Kelly Vidal*
Katherine Kelly Vidal
*Director of the United States Patent and Trademark Office*